United States Patent
Amini et al.

(10) Patent No.: US 11,123,733 B2
(45) Date of Patent: Sep. 21, 2021

(54) INERTIAL DROPLET GENERATION AND PARTICLE ENCAPSULATION

(71) Applicant: Illumina, Inc., San Diego, CA (US)

(72) Inventors: Hamed Amini, Menlo Park, CA (US); Arash Jamshidi, Menlo Park, CA (US); Tarun Kumar Khurana, Menlo Park, CA (US); Foad Mashayekhi, Menlo Park, CA (US); Yir-Shyuan Wu, Menlo Park, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 16/691,405

(22) Filed: Nov. 21, 2019

(65) Prior Publication Data

US 2020/0086322 A1    Mar. 19, 2020

Related U.S. Application Data

(62) Division of application No. 15/347,709, filed on Nov. 9, 2016, now abandoned.

(60) Provisional application No. 62/253,605, filed on Nov. 10, 2015.

(51) Int. Cl.
*B01L 3/00* (2006.01)
*B01F 3/08* (2006.01)
*B01F 13/00* (2006.01)

(52) U.S. Cl.
CPC ...... *B01L 3/502761* (2013.01); *B01F 3/0807* (2013.01); *B01F 13/0062* (2013.01); *B01L 3/502776* (2013.01); *B01L 3/502784* (2013.01); *B01J 2219/005* (2013.01); *B01J 2219/00468* (2013.01); *B01J 2219/00722* (2013.01); *B01L 2200/0636* (2013.01); *B01L 2200/0647* (2013.01); *B01L 2200/0652* (2013.01); *B01L 2300/0816* (2013.01); *B01L 2300/0858* (2013.01); *B01L 2300/0867* (2013.01); *B01L 2300/0883* (2013.01)

(58) Field of Classification Search
CPC ......... B01L 3/502761; B01L 3/502776; B01L 3/502784; B01L 2300/0883; B01L 2200/0652; B01L 2300/0816; B01L 2300/0867; B01L 2200/0636; B01L 2200/0647; B01L 2300/0858; B01F 3/0807; B01F 13/0062; B01J 2219/00468; B01J 2219/005; B01J 2219/00722
See application file for complete search history.

(56) References Cited

U.S. PATENT DOCUMENTS

| | | | |
|---|---|---|---|
| 8,186,913 B2 | 5/2012 | Toner et al. | |
| 2008/0185057 A1 | 8/2008 | Prakash et al. | |
| 2010/0021984 A1 | 1/2010 | Edd et al. | |
| 2011/0223314 A1 | 9/2011 | Zhang et al. | |
| 2013/0233420 A1 | 9/2013 | Di Carlo et al. | |
| 2015/0298091 A1 | 10/2015 | Weitz et al. | |
| 2017/0009274 A1* | 1/2017 | Abate | C12Q 1/68 |

FOREIGN PATENT DOCUMENTS

| | | |
|---|---|---|
| WO | WO 2007/093043 A1 | 8/2007 |
| WO | WO 2008/130977 A2 | 10/2008 |

OTHER PUBLICATIONS

Di Carlo, Dino, et al., Continuous inertial focusing, ordering, and separation of particles in microchannels, PNAS, Nov. 27, 2007, pp. 18892-18897, vol. 104-48.
Edd, Jon F., et al., Controlled encapsulation of single cells into monodisperse picoliter drops, Lab on a Chip, Aug. 2008, pp. 1262-1264, vol. 8-8.
Kemna et al "High-yield cell ordering and deterministic cell-in-droplet encapsulation using Dane flow in a curved microchannel" Lab on a Chip, 2012, 12: 2881-2887. (Year: 2012).
Lee, Wonhee, et al., Dynamic self-assembly and control of microfluidic particle crystals, PNAS, Dec. 28, 2010, pp. 22413-22418, vol. 107-52.
Mazutis,Linas, et al. Single-cell analysis and sorting using droplet-based microfluids, Nature Protocols, Apr. 4, 2013, vol. 8-5, pp. 870-891.
International Search Report for Application No. PCT/US2016/061119 dated Jan. 20, 2017.
Huang, Di, et al., Microfluidics-Based Circulating Tumor Cells Separation, Jiangsu Key Laboratory for Design and Manufacture or Micro-Nano Biomedical Instruments, Southeast University, Nianjing 211189, China, Abstract Only.
Lee, Wonhee, et al., Intertial Microfluidics, Physics and high technololgy, vol. 22, No. 9, Sep. 2013, Abstract only.
Huang, Di et al., "Microfluids-Based Circulating Tumor Cells Separation" Progress in Chemistry, vol. 27, No. 7, pp. 882-912.

* cited by examiner

*Primary Examiner* — Narayan K Bhat
(74) *Attorney, Agent, or Firm* — Knobbe Martens Olson & Bear LLP

(57) ABSTRACT

Described are microfluidic devices and methods for providing a predetermined number of microspheres or beads, together with a cell, within a fluid droplet being processed. The system may provide each droplet with a single bead and a single cell, and the bead may contain DNA or other reagents for later identifying the specific cell associated with that bead.

24 Claims, 18 Drawing Sheets

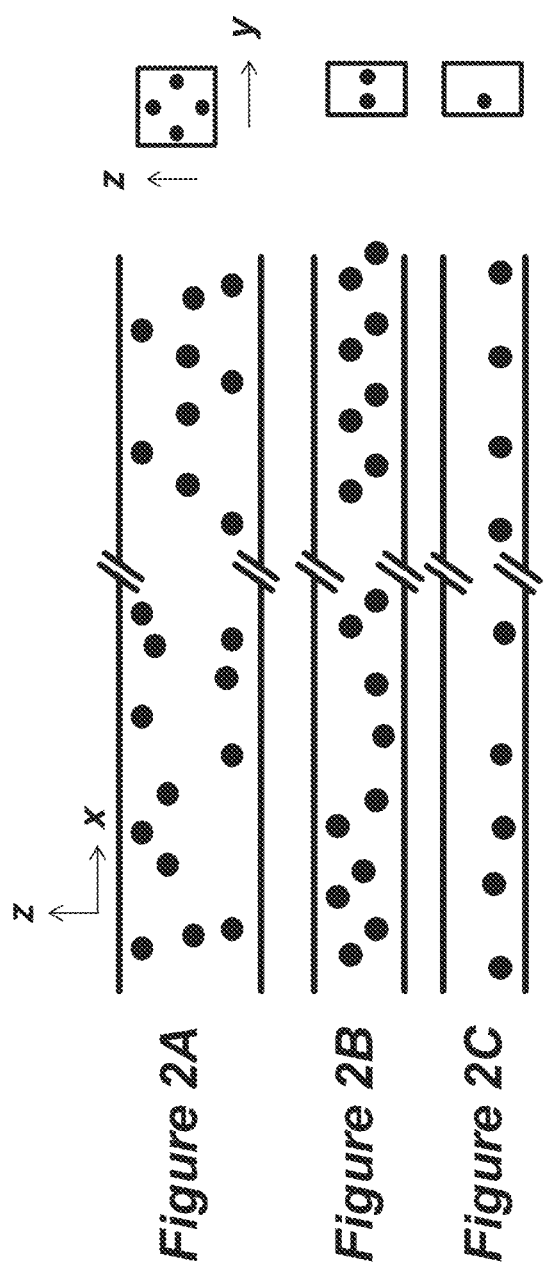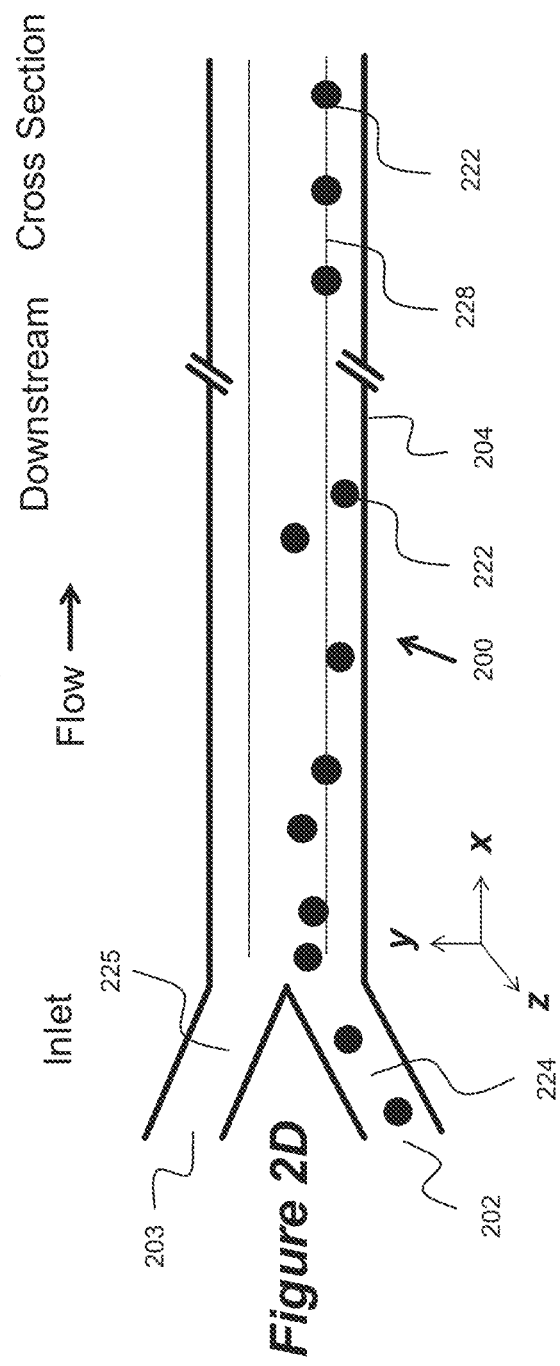

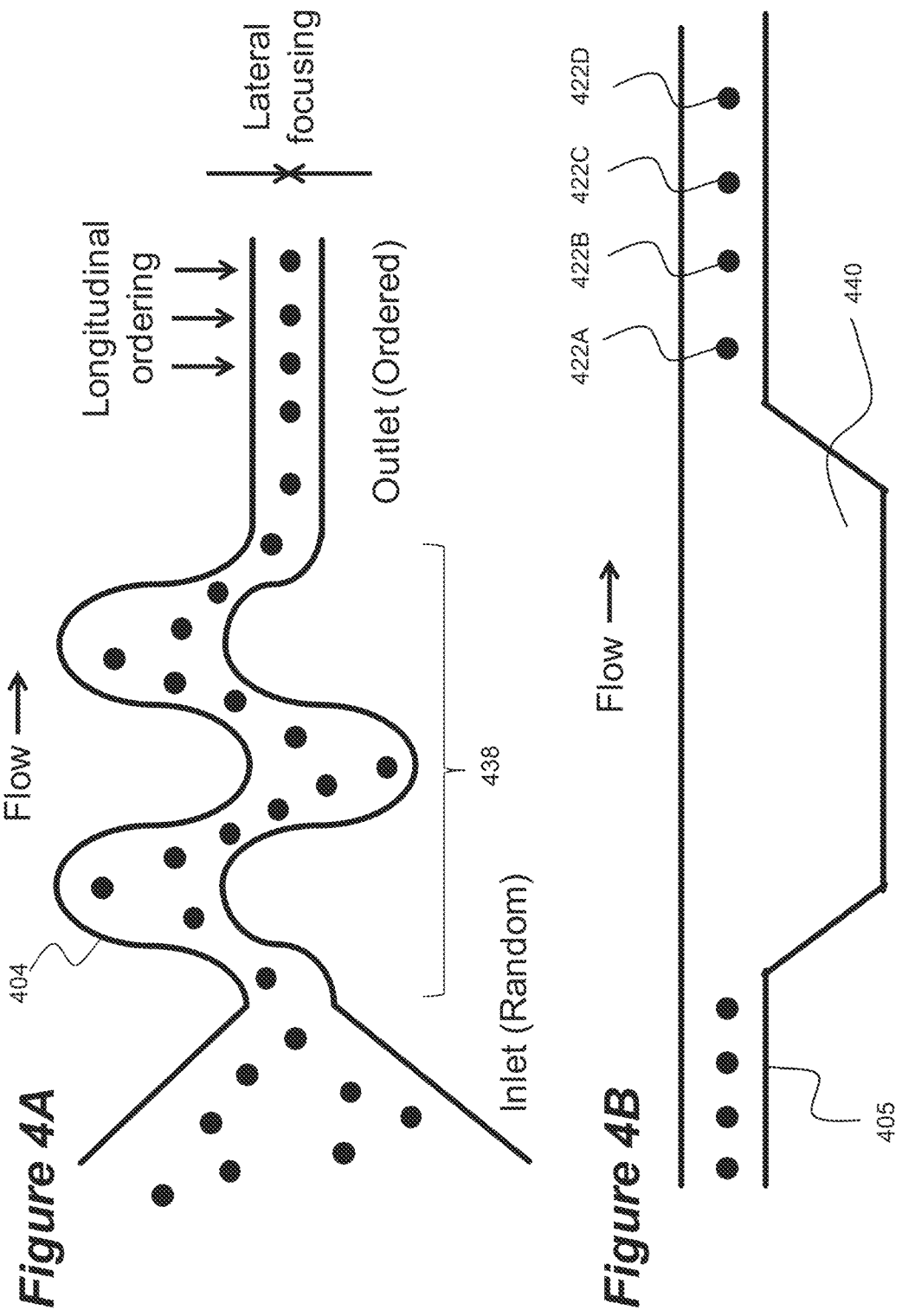

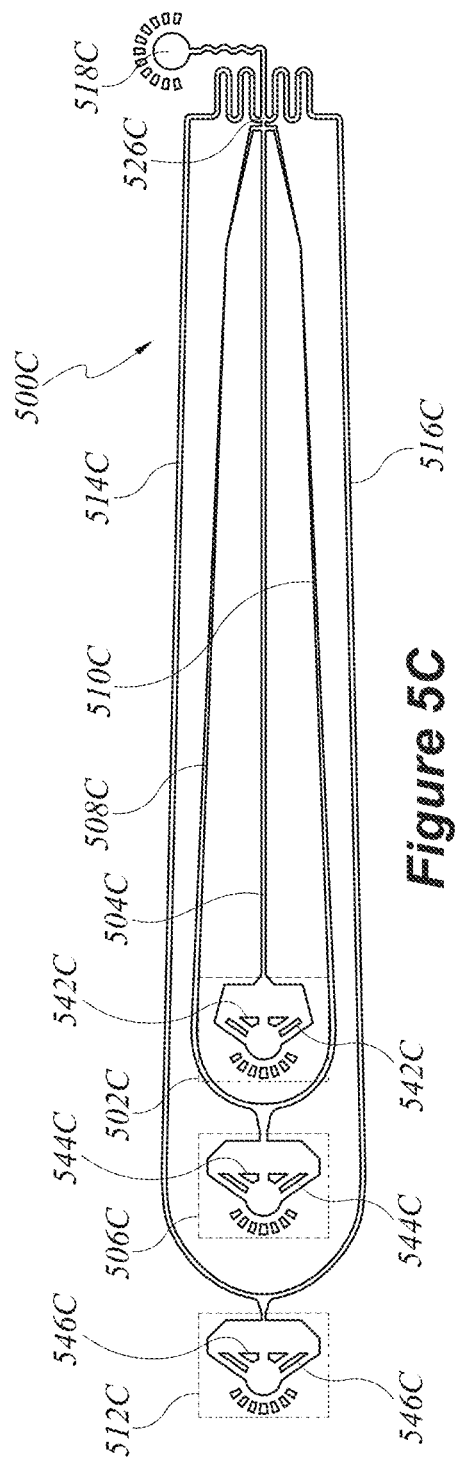
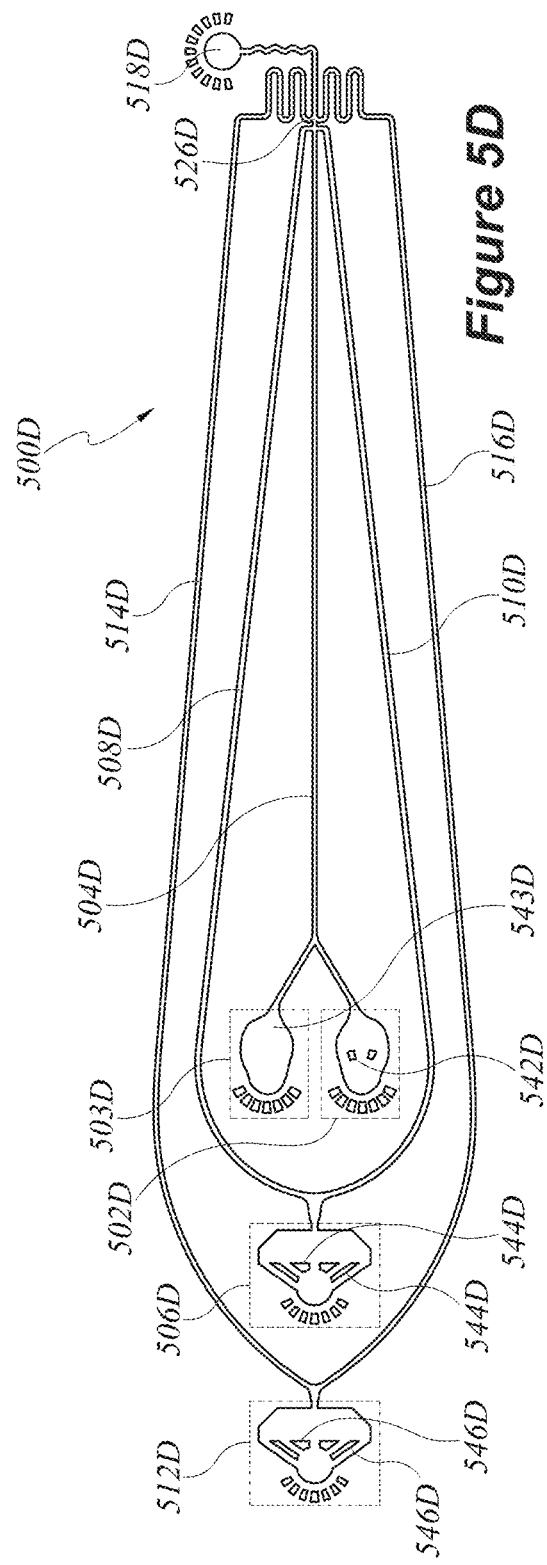

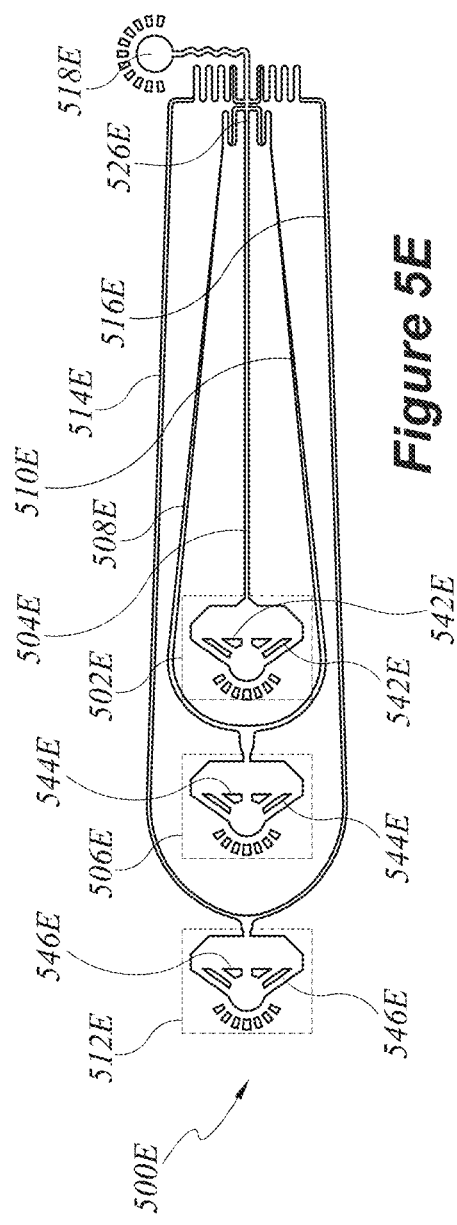
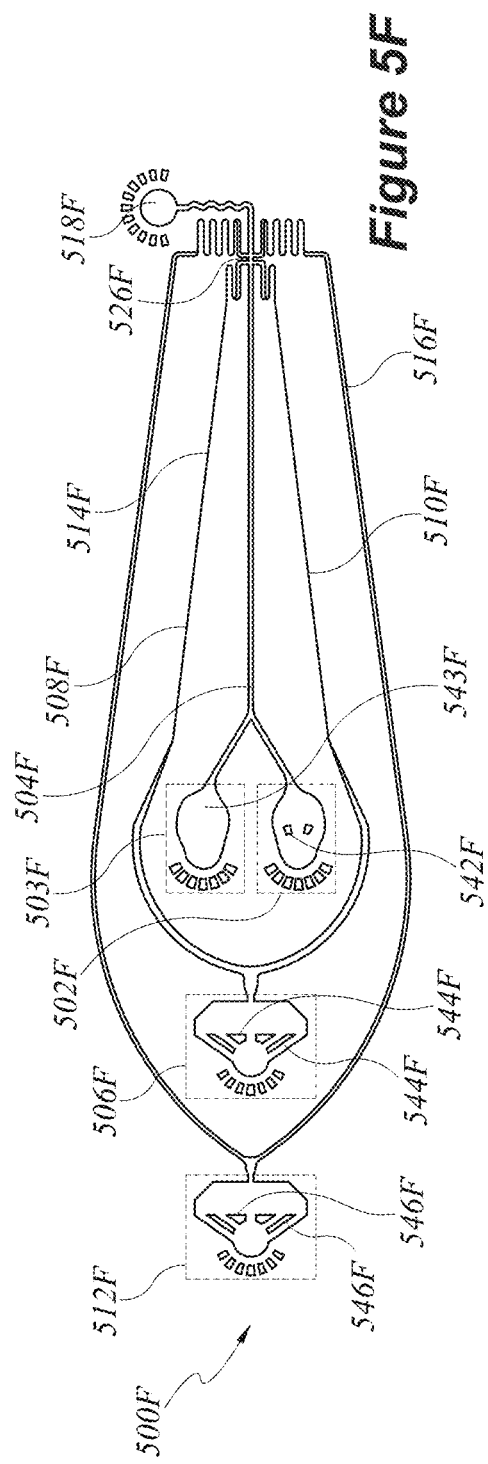

INERTIAL DROPLET GENERATION AND PARTICLE ENCAPSULATION

CROSS-REFERENCE TO RELATED APPLICATIONS

This application is a divisional of U.S. patent application Ser. No. 15/347,709, filed Nov. 9, 2016, which claims priority to U.S. Provisional Application No. 62/253,605, filed Nov. 10, 2015, the contents of each of which are incorporated by reference in their entireties.

BACKGROUND

Field

The invention relates to the fields of microfluidics and encapsulation of particles such as beads, nucleic acid fragments, and cells into droplets for performing biological and chemical reactions.

Description of Related Art

Microfluidic devices may be used to move fluids through narrow channels to perform certain diagnostic or other reactions. These devices can include inlets for receiving one or more fluids and outlets for transferring fluids to external devices or systems.

SUMMARY

In one aspect, the invention features methods of generating liquid droplets containing two or more types of particles. The methods include focusing a bead fluid having beads suspended therein into a first ordered stream of beads within a first microchannel; focusing a cell fluid having cells suspended therein into a second ordered stream of cells within a second microchannel; and merging the first ordered stream with the second ordered stream to form a plurality of droplets having a predetermined number of cells and beads within each droplet. In one example, the first microchannel has a minimum cross-sectional dimension D and the beads have a cross-sectional dimension that is at least about 0.1 D. The cells have a cross-sectional dimension that is at least about 0.1 D. Merging of the first ordered stream and the second ordered stream includes contacting with a third fluid immiscible in the first fluid and the second fluid. Focusing the beads includes passing the beads through a first inertial focusing portion of the first microchannel. Focusing the cells includes passing the cells through a second inertial focusing portion of the second microchannel.

In certain of these methods, the beads include nucleotide fragments. The nucleotide fragments include a tag or barcode region, an index region, and a capture region. The tag or barcode region of each nucleotide fragment can be at least about six nucleotides in length. The index region of each nucleotide fragment can be at least about four nucleotides in length. The capture region includes poly-T nucleotides and can be at least about ten nucleotides in length.

In certain of these methods, the predetermined number of cells is one and the predetermined number of beads is one. The Reynolds number of each of the beads is at least about 1, with the Reynolds number of a bead defined as $$Rp = \frac{\rho U_m H}{\mu}\left(\frac{a}{H}\right)^2,$$

where $\rho$ is the density of the bead fluid, $U_m$ is the maximum flow speed of the bead fluid, H is the hydraulic diameter of the first microchannel, a is a diameter of the bead, and $\mu$ is the dynamic viscosity of the bead fluid. The Reynolds number of each of the cells is at least about 1, with the Reynolds number of a cell defined as $$Rp = \frac{\rho U_m H}{\mu}\left(\frac{a}{H}\right)^2,$$

where $\rho$ is the density of the cell fluid, $U_m$ is the maximum flow speed of the cell fluid, H is the hydraulic diameter of the second microchannel, a is a diameter of the cell, and $\mu$ is the dynamic viscosity of the cell fluid.

In certain of these methods, the proportion of the plurality of droplets containing $k_1$ beads and $k_2$ cells is greater than $(\lambda_1^{k_1} \exp(-\lambda_1)/(k_1!)) (\lambda_2^{k_2} \exp(-\lambda_2)/(k_2!))$, where $\lambda_1$ is the average number of the beads per droplet and $\lambda_2$ is the average number of the cells per droplet. The flow rate of the first ordered stream is at least about 10 μL/min, or is about 10 to 100 μL/min, or is about 40 to 70 μL/min, or is about 45 to 65 μL/min, or is about 50 to 60 μL/min, or is about 50 μL/min, or is about 60 μL/min. The flow rate of the second ordered stream is at least about 10 μL/min, or is about 10 to 100 μL/min, or is about 40 to 70 μL/min, or is about 45 to 65 μL/min, or is about 50 to 60 μL/min, or is about 50 μL/min, or is about 60 μL/min.

In one embodiment, a droplet generation system includes a first inlet connected to a first inertial focusing microchannel disposed in a substrate; a first flow source configured to drive a bead fluid containing beads through the first inertial focusing microchannel; a second inlet connected to a second inertial focusing microchannel disposed in the substrate, where the first inertial focusing microchannel is connected to the second inertial focusing microchannel for forming the bead fluid and the cell fluid into a plurality of droplets; a second flow source configured to drive a cell fluid containing cells through the second inertial focusing microchannel.

In some embodiments, one or more particle channels may have a curved region to decrease the focusing length required and to decrease the device foot-print. In some embodiments, one or all channels for a first particle type A (such as beads) may have a curved region to decrease the focusing length required and to decrease the device foot-print. In some embodiments, one or all channels for a second particle type B (such as cells) may have a curved region to decrease the focusing length required and to decrease the device foot-print. The curved regions may be symmetrically curved. In some embodiments, the curved regions may be asymmetrically curved, such as S-shaped, sinusoidal, or sigmoidal shaped, or continuously curved in a spiral pattern. In some embodiments, the curved regions of some or all of the channels are sinusoidal. In some embodiments, the curved regions of some or all of the channels are spiral shaped. In some embodiments, the bead channels, or the cell channels, or both the bead and cell channels comprise spiral shaped regions. In some embodiments, the bead channels, or the cell channels, or both the bead and cell channels comprise sinusoidal regions. In some embodiments, the bead channels comprise spiral regions and the cell channels comprise sinusoidal regions.

In some embodiments, the bead channel 104 may have an expansion/contraction region which enables the adjustment of the spacing between beads inside the channel. In some embodiments, one or both of the cell channels 108, 110 may have an expansion/contraction region which enables the adjustment of the spacing between cells inside the channel.

Optionally, the first inertial focusing microchannel includes a side wall having an irregular shape (e.g., a discontinuity in the linear nature of the side wall). Optionally, the second inertial focusing microchannel includes a side wall having an irregular shape. Optionally, the irregular shape includes a first irregularity protruding from a baseline surface away from a longitudinal axis of the inertial focusing microchannel with the irregular shape. In some instances, the irregularity narrows the microchannel with respect to the longitudinal axis and in other instances the irregularity expands the microchannel with respect to the longitudinal axis. Optionally, each irregular shape is independently selected from the group consisting of trapezoidal, triangular, rounded, and rectangular. In some embodiments, the group further includes elliptical or unsymmetrical shapes. In some embodiments, the microchannel includes a plurality of irregular shapes along a portion of the microchannel. The irregular shapes may be of the same shape or different shapes.

In some embodiments, one or both of the first inertial focusing microchannel and the second inertial focusing microchannel have an expansion/contraction region having a side wall, where the side wall has a stepped surface. In some embodiments, at least one of the first inertial focusing microchannel and the second inertial focusing microchannel has an expansion/contraction region having a side wall, where the side wall has a curved surface. In some embodiments, at least one of the first inertial focusing microchannel and the second inertial focusing microchannel has a curved region having a Dean number of up to about 30. In some embodiments, one of the first inertial focusing microchannel and the second inertial focusing microchannel has a side wall with a stepped surface. In other embodiments, both inertial focusing microchannels have side walls with stepped surfaces.

BRIEF DESCRIPTION OF THE FIGURES

FIGS. 2A-D are schematic drawings showing bead focusing through different sized bead channels. FIG. 2A shows beads flowing through a square channel. FIG. 2B shows beads flowing through a rectangular channel having a cross-sectional dimension or flow rate that allows two beads to flow adjacent one another. FIG. 2C shows beads flowing through a rectangular channel having a cross-sectional dimension or flow rate that focuses the beads so that the beads flow in a single file line within the bead channel due to presence of bead-present and bead-absent co-flows. FIG. 2D is a top schematic view of an inertial focusing bead channel having a dual-inlet co-flow configuration.

FIGS. 4A-B are schematic drawings of embodiments of flow channels configured to provide an inertial ordering process. FIG. 4A is a schematic drawing of the inertial ordering processing with an asymmetrical curving channel. FIG. 4B is a schematic drawing showing the use of an expansion/contraction region within the flow channels to tune the spacing between ordered beads inside the channel.

FIGS. 5A-F show different embodiments of microchannel configurations for the ordering and focusing of cells and beads within microchannels.

FIG. 12A shows the image taken from the instrument. FIG. 12B depicts the same image as FIG. 12A, except that the contrast level has been adjusted to allow for easier visualization of the sepharose gel beads.

FIG. 13A shows the image taken from the instrument. FIG. 13B depicts the same image as FIG. 13A, except the contrast level has been adjusted to allow for easier visualization of the sepharose gel beads.

FIG. 14A shows a system with two adjacent spiral channels and one channel comprising a sinusoidal curve. FIG. 14B shows a system with two spiral channels on opposite ends of the system, surrounding two concentric channels comprising sinusoidal regions.

FIG. 15A shows two cell channels feeding into a bead channel (width b) and resulting in a single channel of width m. Two oil inlet channels then converge, yielding a single channel with width d. FIG. 15B shows a variation of the configuration shown in FIG. 15A in which channel widths m and d are increased relative to channel width b.

DETAILED DESCRIPTION

Figure 1:
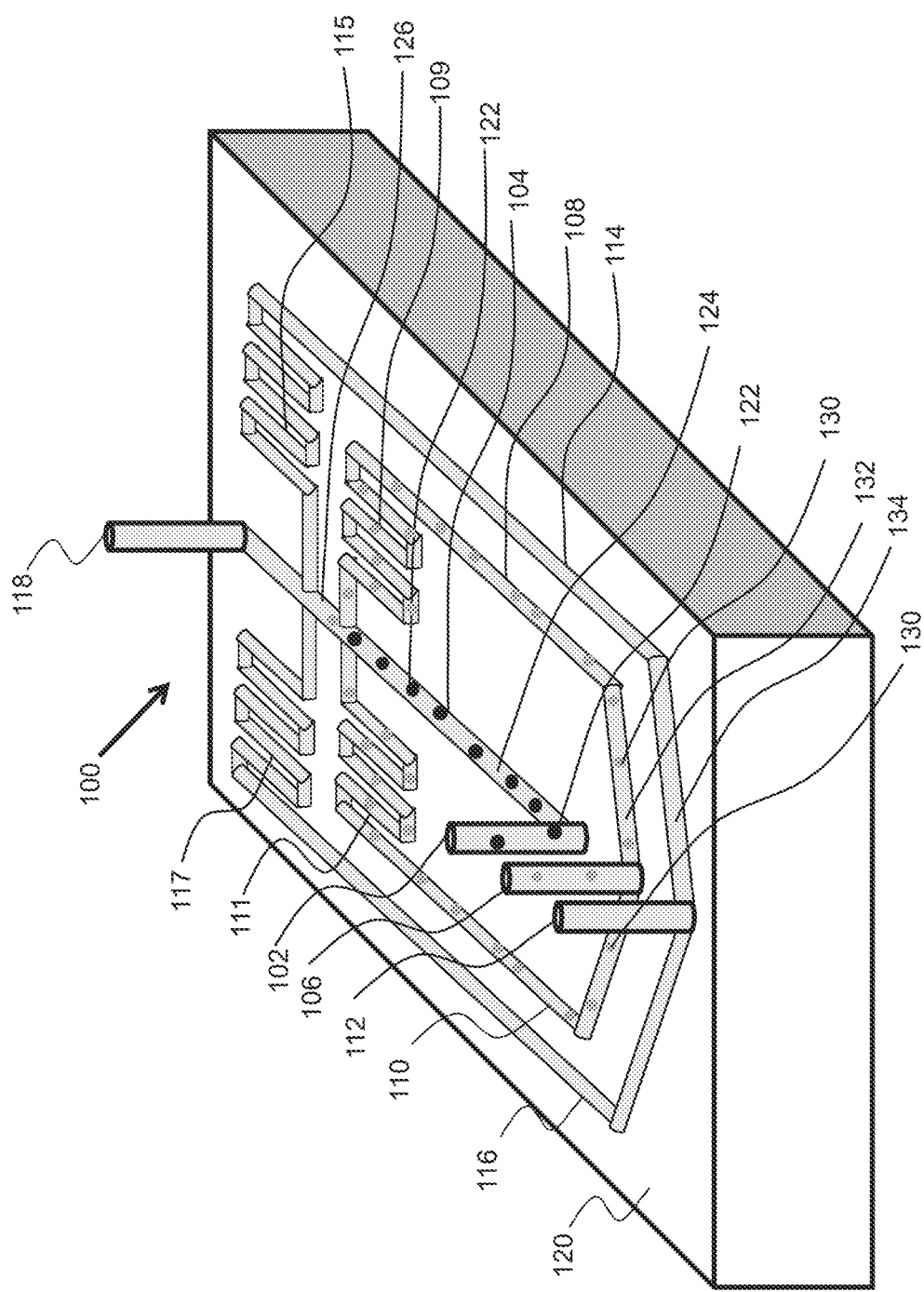
FIG. 1 is a perspective view of one embodiment of a system for the separation, ordering, and focusing of cells and beads within microchannels prior to droplet generation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments relate to the fields of microfluidics and includes devices and methods for encapsulation of particles, such as beads, nucleic acid fragments, and cells into droplets. Various embodiments described below use laminar flow of a fluid, such as an oil, through microfluidic channels to result in the continuous and accurate self-ordering of particles suspended within the fluid. As discussed below, embodiments include microfluidic devices having a variety of specific channel geometries that can be configured to advantage of the self-ordering liquid flows to create continuous streams of ordered particles constrained in three spatial dimensions. Particles order laterally within the y-z plane (or cross-sectional plane) of a fluidic channel and can also order longitudinally along the direction of fluid flow (i.e., the x direction). An additional dimension of rotational ordering can occur for asymmetrically shaped particles.

One embodiment includes methods and devices that perform reactions within droplets flowing in a microchannel device. For example, in one embodiment a microchannel device is designed to mix a single cell with a single bead in one droplet. Each bead applied to the microchannel device bears one or more nucleotide fragments, and each nucleotide fragment comprises a unique DNA tag. The DNA tag may be a barcode or other DNA sequence having the same nucleotide sequence on all fragments bound to a single bead. The DNA tag may alternatively be an index sequence which has a different nucleotide sequence for each fragment on a single bead. The tag may also include a capture region that can be used to capture the tag by hybridization to other DNA sequences. For example, the capture region may comprise a poly-T tail in some embodiments. In this construct, each bead is uniquely tagged in comparison to all other beads being used in the device. Thus, when a single cell and a single bead are encapsulated into a droplet and are exposed to lysis buffer (for example, the lysis buffer is present in the droplet when encapsulation occurs, or is added to the droplet after encapsulation), the cell is lysed, and each polyadenylated mRNA in the cell becomes bound to the poly-T tail of the capture region on the bead with which it is encapsulated. If the bead is then subjected to a cDNA reaction using reverse transcriptase and the appropriate primer, cDNA strands are formed having the original mRNA sequences along with the unique tag from the bead that was encapsulated with the cell. This results in all of the mRNA from a single cell being labeled with a unique tag sequence from the bead. This procedure allows later sequencing reactions to be performed in bulk, with cDNA samples from many cells being sequenced, but each having a unique tag so that they can be sorted from one another. The index is used to correct for amplification errors and avoid multiple-counting of a single molecule. At the end of an experiment, the mRNA expression of individual cells can be determined by sequencing the cDNA and determining which mRNA population was present in each cell, and the expression level of that mRNA.

In one embodiment, the microchannel device is configured to separate, order, and focus streams of beads to focusing positions within a channel flow field that result in the creation of droplets each with a predetermined number of beads and cells. The focusing can be based, at least in part, on inertial lift forces. In square channels, this can lead, for example, to four streams of focused particles spaced an equal distance apart from a center of each of the four square faces. For rectangular geometries, this four-fold symmetry can be reduced to a two-fold symmetry, with streams of particles spaced apart from each of two opposed faces of the channel.

In some embodiments, a dual-inlet co-flow system serves to create a first focused, ordered stream of particles A and a second focused, ordered stream of particles B, where particles A and B are of different types. In some embodiments, the system serves to create a single focused bead stream and a single focused cell stream (e.g., the A particles are beads and the B particles are cells). In some embodiments, the two streams of particles are merged in the system to create a single stream comprising the particles A and B, such as beads and cells. The merged stream of particles is then contacted with an oil or other immiscible fluid to create a droplet containing the two particle types. Thus, in some embodiments, a third fluid stream is introduced that serves to encapsulate the two types of particles. In some embodiments, the third fluid stream comprises a carrier fluid that is immiscible or partially immiscible with the first and second stream fluids and/or the combined first/second stream fluid.

Embodiments include microchannel devices that encapsulate a selected number of A and B particles in a droplet. For example, the device may be configured to encapsulate no more than one A particle and no more than one B particle in a single droplet, or up to one A particle and one B particle in a single droplet, or one A particle and one B particle in a single droplet. Configurations of fewer, or more, A particles and fewer, or more, B particles in a single droplet are also contemplated, including but not limited to two A particles and one B particle, or one A particle and two B particles.

Embodiments also relate to microchannel devices that place a selected number of beads and cells into a droplet. For example, the device may be configured to encapsulate no more than one bead and no more than one cell in a single droplet, or up to one bead and one cell in a single droplet, or one bead and one cell in a single droplet. Configurations of fewer or more beads and fewer or more cells in a single droplet are also contemplated, including but not limited to two beads and one cell, or one bead and two cells. In one embodiment, the device may be configured to encapsulate one bead and one cell within a single droplet. Other configurations of fewer or more beads and cells per droplet are also contemplated, including but not limited to two beads and one cell, or one bead and two cells, or one bead and a plurality of cells, or a plurality of beads and one cell. This process is typically done by merging a stream of fluid containing beads with a stream of fluid containing cells. The merged stream of beads and cells is then contacted with an oil or other immiscible fluid to create a droplet containing the beads and cells.

These configurations produce extremely high concentrations of single droplets with beads and have a $\lambda$ approaching 1, where $\lambda$ is the average of Poisson distribution of beads being encapsulated into droplets, but avoid having droplets with multiple bead occupancy—thus creating an underdispersed Poisson distribution, e.g., a Poisson distribution with average distribution of $\lambda$ but variance of $\varphi$ which is smaller than $\lambda$, ideally with $\varphi$ approaching 0. This high concentration of droplets with single bead occupancy allows systems that require such droplets (such as a high throughput single cell system) to improve throughput by 10-20 times over systems in which ordered streams are not used with decreased error rate (e.g., a decreased number of droplets with an undesired number of beads or cells). Similarly, the capture efficiency of the cells can be improved to the same order of magnitude. Thus, embodiments that employ focusing, such as inertial focusing as described below, for both beads and cells may overcome both Poisson distributions, one for beads and one for cells, in double-Poisson statistics, thus achieving more than 100× improvement in throughput. Embodiments may be operated continuously and at high volumetric flow rates with cascading outputs yet still produce droplets having the desired numbers of beads and cells per droplet.

Systems and methods may relate to inertial microfluidic technology for high-throughput and precise microscale control of cell and particle motion. These systems and methods may be suitable for applications in any type of nucleic acid sequence analysis, including long-read DNA sequencing, paired-end sequencing, and single cell sequencing. The generation of droplets each with, for example, one bead and one cell enable the continuous analysis and sequencing of single cells.

While there are many configurations possible in a system for the self-ordering of particles, such as cells and beads, within microfluidic channels and encapsulation of particles, one embodiment of such a microfluidic system 100 is illustrated in FIG. 1. As shown, the microfluidic system 100 generally includes three inlets: a bead inlet 102 that connects to a bead channel 104, a cell inlet 106 that connects to two cell channels 108, 110 on the two sides of the bead channel 104, and an oil inlet 112 that connects to two oil channels 114, 116 which are the outermost channels of the system 100 and are next to the cell channels 108, 110 and spaced laterally away from the bead channel 104. The microfluidic system 100 generally has one system outlet 118. The microfluidic system 100 can be provided on a microfabricated chip 120 with the various channels formed in the chip 120.

The bead inlet 102 is configured for introducing beads 122 suspended in a bead fluid 124 into the microfluidic system 100. The beads 122 can be of any density made up of various materials. The bead channel 104 formed in the chip 120 can have numerous configurations which will be described in detail below. In general, the bead channel 104 can have a specified geometry designed to separate, order, and focus the beads 122 to pre-determined lateral positions in the channel when entering a droplet generation junction 126. These lateral locations correspond to similar flow velocities in the velocity profile of the bead fluid 124 such that, once focused, the beads 122 move at more or less similar speeds and maintain their spacing and generally do not cross each other. The bead channel 104 may be straight as shown. The bead channels used in the microfluidic systems can have various geometries and cross-sections as detailed below for focusing beads of a predetermined size suspended within a fluid. For example, bead channel 104 may have a square cross-section.

In general, the size of the bead channel 104 is related to the size of the beads 122 intended to be used within the channel. For example, as mentioned below, 80-125 μm diameter bead channels were successfully used for separating, ordering, and focusing beads that were 30-50 μm in size. The closer the size of the channel was to the bead size, the faster and more efficient the separating, focusing, and ordering was found to be.

The cell channels 108, 110 have long serpentine regions 109, 111 respectively. The oil channels 114, 116 also have long serpentine regions 115, 117 respectively. These long serpentine regions act as fluidic resistances to ensure equal distribution of fluid flow on both branches of the corresponding channel.

In some embodiments, the bead channel 104 may have a curved region to decrease the focusing length required and to decrease the device foot-print. In some embodiments, one or both of the cell channels 108, 110 may have a curved region to decrease the focusing length required and to decrease the device foot-print. The curved regions may be symmetrically curved. In some embodiments, the curved regions may be asymmetrically curved, such as S-shaped, sinusoidal, or sigmoidal shaped. In some embodiments, the bead channel 104 may have an expansion/contraction region which enables the adjustment of the spacing between beads inside the channel. In some embodiments, one or both of the cell channels 108, 110 may have an expansion/contraction region which enables the adjustment of the spacing between cells inside the channel.

As shown in FIG. 1, the cell inlet 106 is configured for introducing cells 130 suspended in a cell fluid 132 into the microfluidic system 100 through the cell channels 108, 109. The oil inlet 112 is configured for introducing droplet generation oil 134 to the droplet generation junction 126 through the oil channels 114, 116. The two lateral flows of droplet generation oil 134 pull droplets from the stream of aqueous bead fluid 124 with the same frequency, or multiple of, that beads reach the droplet generation junction 126. Similarly, the two lateral flows of droplet generation oil 134 pull droplets from the stream of aqueous cell fluid 132 with the same frequency, or multiple of, that cells reach the droplet generation junction 126. At the device outlet 118, droplets exit the microfluidic device 100 in an orderly fashion with every droplet generally encapsulating one bead and/or one cell in the particular design illustrated in FIG. 1.

The chip 120 can also include a straight section of channel at an output region for analysis of focused particles, collection of focused particles, and/or for recombining stream lines.

Inertial Focusing

The bead channels used in the microfluidic systems can have various geometries and cross-sections for focusing beads of a predetermined size suspended within a fluid. FIGS. 2A-FIG. 2D show dynamic bead self-assembly in a finite-Reynolds number flow. All views are from above bead channel 204 such that differences in position along the channel cross-sectional width can be visualized. Inertial migration focuses beads to transverse equilibrium positions. Beads migrate to defined equilibrium positions, for example, four in a square channel (FIG. 2A) and two in a rectangular channel (FIG. 2B). In one embodiment illustrated in FIG. 2A, a straight channel is provided having a square cross-section with an aspect ratio of substantially 1 to 1. Beads of a predetermined size flowing within such a channel geometry will be separated, ordered, and focused into four focusing positions shown in the cross sectional view of FIG. 2A. These four focusing positions correspond to four equilibrium points, or potential minimums, at a distance from each face of the four channel walls.

By designing a channel with aspect ratio (here defined as the ratio of the longer side to the shorter side of the cross-section) larger than 1, the number of focusing positions can be successfully decreased from four to two. In one embodiment, the aspect ratio may be greater than about 1.2, although other aspect ratios of about 1.1, 1.3, 1.4, 1.5 or more are also contemplated. In one embodiment shown in FIG. 2B, a straight bead channel is provided having a rectangular cross-section with an aspect ratio of substantially 2 to 1. Beads of a predetermined size flowing within such channel geometry can be separated, ordered, and focused into two focusing positions corresponding to two equilibrium points or potential minimums along the wider side walls across the width of the channel. In some embodiments, the wider side of the channel can be parallel to either y or z direction leading to bead focusing on either top-and-bottom or left-and-right of the channel respectively. Through the process of lateral bead focusing, the beads interact with each other and order themselves longitudinally as well. Bead may be both laterally focused (in an y-z plane) and/or longitudinally ordered (in an x direction). The inter-bead interactions create a repulsive force between bead pairs that spaces them out along the channel, leading to creation of bead lattices.

To obtain a single focusing position shown in FIG. 2C, a dual-inlet co-flow system 200 with a rectangular inertial focusing bead channel 204 with a wider side in the z-direction (leading to left-and-right focusing in the cross-section view) as shown in FIG. 2D can be used. By using two bead inlets 202, 203 connected to the bead channel 204 and injecting beads in the bead fluid 124 on only one side of the channel, with the other stream only containing fluid (and no beads), the focusing position can be further decreased to 1. This leads to more efficient ordering of the beads along the channel. Co-flowing with bead-free fluid was found to confine beads on one side of a microchannel resulting in a single line of beads with regular and repeatable spacing. A similar concept can be used for focusing of cells and other types of particles as well.

FIG. 2D is a schematic view of a dynamic self-assembling bead system including a two-inlet bead channel. Randomly distributed beads are self-assembled through inertial lift forces and hydrodynamic bead-bead interactions. The dual-inlet co-flow system 200 reduces the degrees of freedom by focusing beads 222 into a single substantially axially aligned stream at one focusing position 228 (FIG. 2D). Unprocessed, the beads 222 in a bead fluid 224 are flowed through the "lower" bead inlet 202. A bead-free fluid 225 is flowed through the "upper" bead inlet 203. As a result, the bead-free fluid 225 flows through in the "upper" half of bead channel 204 and the beads 222 are confined to the "lower" half of the bead channel 204 so that the beads 222 align at the one focusing position 228. This equilibrium state becomes a one-dimensional system where inter-bead spacing is a dependent variable dependent on, for example, flow, fluid and geometric parameters.

In general, "focusing" refers to a reduction in the area of a cross-section of a channel through which a flux of beads passes. In some embodiments, beads can be localized within an area having a width of, at most, 1.01, 1.05, 2, 3, 4, or 5 times the width of the beads. Localization can occur at any location within the channel, including within an unobstructed portion of the channel. For example, localization can occur in a portion of the channel having less than 50%, 40%, 30%, 20%, 10%, 5%, 2%, 1%, or 0.1% reduction in cross-sectional area. In certain embodiments, localization can occur in a channel having a substantially constant cross-sectional area.

Inertial focusing within microchannels has been described in Di Carlo et al., Proceedings of the National Academy of Sciences of the United States of America 104:18892-97 (2007), which is hereby incorporated by reference. Briefly, self-assembling systems, in general, require multiple interactions that include positive and negative feedback, which for bead systems are realized as attractive and repulsive forces. Viscous reversing wakes, which are induced by confinement, repel neighboring beads to infinity while fluid inertia in the form of lift forces act to maintain the beads at finite distances. This mechanism of dynamic self-assembly of microscale beads in a finite-Reynolds-number channel flow provides parameters for controlling bead stream self-assembling and allow expanded bead control in microchannel systems. Such control is useful for applications such as low-pass spatial filtering on bead spacing. Microfluidic devices can be designed and operated to control bead-bead and bead-wall interactions in order to manipulate inter-bead spacing and reduce defocusing.

Although a Stokes flow (e.g., $R_e=0$) assumption is widely accepted in analyzing inertial effects in microfluidic systems, Reynolds numbers in microfluidic channels often reach ~1 and even ~100s in some extreme cases. Reynolds number, $R_e$, is determined by $$Re = \frac{\rho U_m H}{\mu},$$

where $\rho$ is the density of the fluid, $U_m$ is the maximum flow speed, H is the hydraulic diameter, and $\mu$ is the dynamic viscosity of the fluid. Many inertial effects have been observed in microfluidic devices at such Reynolds numbers. One example is inertial migration of beads in square and rectangular channels. Randomly distributed beads migrate across streamlines due to inertial lift forces, which is a combination of shear gradient lift that pushes beads towards walls and wall effect lift that pushes beads towards the center of a channel. These inertial lift forces focus beads to four (FIG. 2A) or two (FIG. 2B) dynamic "transverse equilibrium points" that are determined by channel symmetry. The system is a non-equilibrium system that constantly dissipates energy and the transverse equilibrium point is where the inertial lift forces become zero in the cross-section of the channel. As used herein "focusing position" refers to these transverse equilibrium points.

While traveling down the channel, the beads are laterally (y direction and z direction) focused by inertial lift forces and simultaneously longitudinally (x direction) self-assembled by bead-bead interactions. Focusing occurs along the width and height of a microchannel, and assembling occurs along the longitudinal axis of the microchannel. In the final organized state, the system of beads has two degrees of freedom: inter-bead spacing and focusing position. Inter-bead spacing is determined by fluid and flow parameters ($U_m$, $\rho$, $\mu$) and geometric parameters (bead diameter (a), channel width (w), and height (h)). These parameters make up a bead Reynolds number $$R_p = Re\left(\frac{a}{H}\right)^2,$$

based on the shear rate at the bead scale, and inter-bead spacing decreases with increasing $R_p$.

When beads are aligned at one focusing position, there is a default inter-bead spacing for any given set of flow and geometric parameters. However, with more than one focusing position, different cross-channel spacing and single-stream spacing appear. Inter-bead spacing does not show a strong dependence on channel aspect ratio. The selection of a focusing position for beads is intrinsically a random event, which makes diverse patterns in the organized structure. However, additional degrees of freedom in the form of additional focusing positions make the resulting bead stream more complicated.

Channel Geometry

The bead channel geometry can have various geometries in contrast to the straight channel geometry as shown in FIG.

Figure 3:
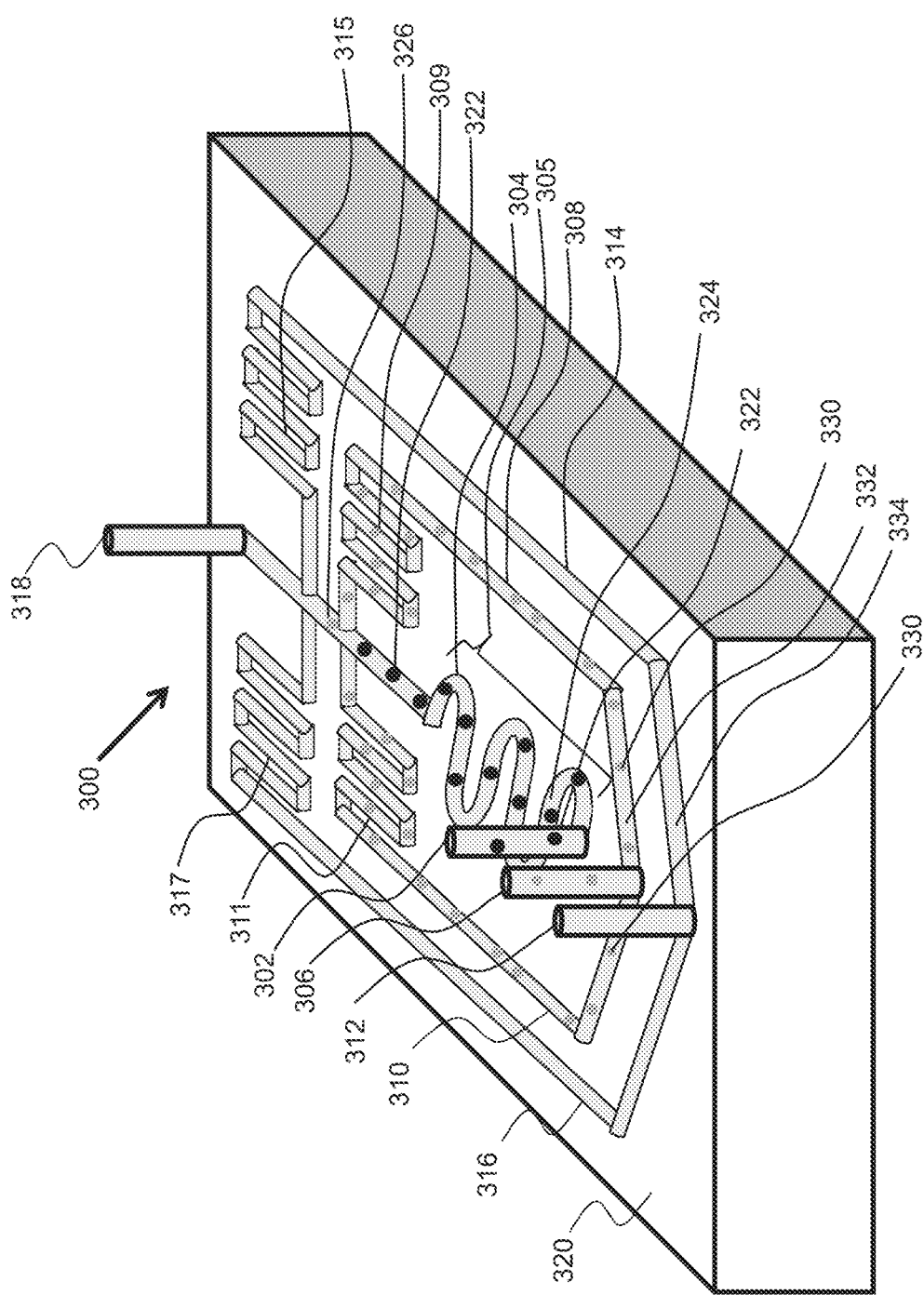
FIG. 3 is a perspective view of an alternate embodiment of a system using curving channels for the separation, ordering, and focusing of cells and beads within microchannels.

1. FIG. 3 illustrates another embodiment of a microfluidic system 300 with a curved bead channel 304. As shown, the microfluidic system 300 generally includes three inlets: a bead inlet 302 that connects to the bead channel 304, a cell inlet 306 that connects to two cell channels 308, 310 on the two sides of the bead channel 304, and an oil inlet 312 that connects to two oil channels 314, 316 which are the outermost channels of the system 300 and are next to the cell channels 308, 310 away from the bead channel 304. The microfluidic system 300 generally has one system outlet 318. The microfluidic system 300 can be provided on a microfabricated chip 320 with the various channels formed in the chip 320.

The bead inlet 304 is configured for introducing beads 322 suspended in a bead fluid 324 into the microfluidic system 300. The beads 322 can be of any density made up of various materials. The bead channel 304 formed in the chip 320 can have numerous configurations which will be described in detail below. In general, the bead channel 304 can have a specified geometry designed to separate, order, and focus the beads 322 to pre-determined lateral positions in the channel when entering the droplet generation junction 326. These lateral locations correspond to similar flow velocities in the velocity profile of the bead fluid 324 such that, once focused, the beads 322 move at similar speeds and maintain their spacing and generally do not cross each other. The bead channel 304 may be curved as shown. Curving channels can be used to decrease the focusing length required and to decrease the device foot-print.

The cell channels 308, 310 have serpentine regions 309, 311 respectively. The oil channels 314, 316 also have serpentine regions 315, 317 respectively.

In one embodiment, symmetrically, asymmetrically, or continuously curved channels can be provided such as S-shaped, sinusoidal, or sigmoidal shaped bead channels having a rectangular cross-section. Beads of a predetermined size flowing within such channel geometry will be generally focused into two focusing positions corresponding to one or two equilibrium points or potential minimums at a distance from left and right side faces of the channel. An aspect ratio of a sigmoidal channel can be substantially 1 to 1 and/or can vary along a length thereof. For example, the aspect ratio of a sigmoidal channel can vary over the length of the channel between 1 to 1 and 2 to 1 depending on the configuration chosen.

In another embodiment as shown in FIG. 4A, the bead channel 404 has a curving region 438. While asymmetrically curved channels can have various shapes and configurations as needed for a particular application, in one embodiment an asymmetric bead channel can generally have the shape of a wave having large and small turns, where a radius of curvature can change after each inflection point of the wave. Each large and small turn can have a specified width of the channel associated with the turn. Asymmetrically curved channels enable both longitudinal ordering and lateral focusing.

In one embodiment, one-half of a wavelength of the channel wave can have a large curve while one-half of a wavelength of the channel wave can have a small curve. These curves can then be repeated as many times as needed, varying after each inflection point, to provide a specified length of channel with an asymmetric curve. The asymmetrically curved bead channel 404 can also have a rectangular cross-section with an aspect ratio that can vary as needed over the channel length depending on the nature of the asymmetry in the curves. In one embodiment, the aspect ratio can vary between 1 to 1 and 2 to 1. In this case, a single focused stream of beads is created corresponding to a single equilibrium point or potential minimum within the channel 404.

Figure 14A:
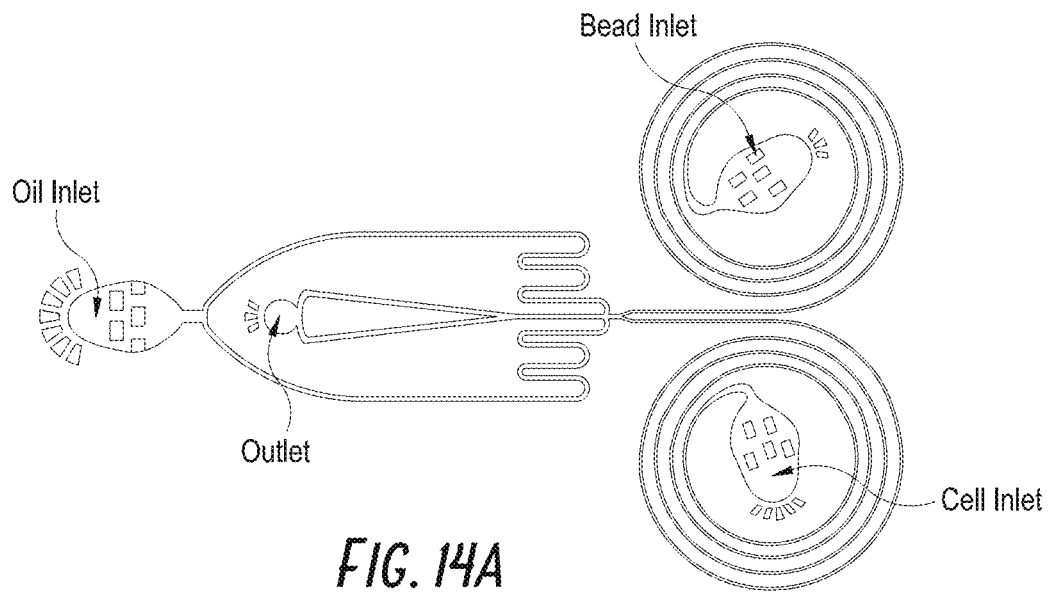
FIGS. 14A-14B depict two embodiments of systems comprising spiral channels.
Figure 14B:
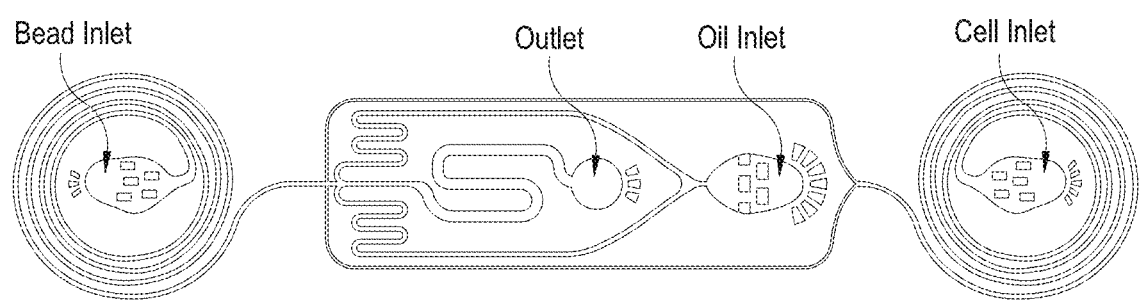

In other embodiments, asymmetric curving bead channels, for example an expanding spiral shaped channel can be provided, having a rectangular cross-section with an aspect ratio of substantially 2 to 1. This aspect ratio may vary. In this case, beads are focused into a single stream line a distance away from an inner wall of the channel corresponding to a single equilibrium point or potential minimum within the channel. Examples of systems that include spiral channels are shown in FIGS. 14A and 14B. In some embodiments, the spiral portion of the channel has an outer diameter of 2 to 10 mm, or about 3 to 7 mm, or about 5 mm, or about 10 mm.

In some embodiments, a single chip may have bead channels with different channel geometries. FIG. 4B shows another embodiment with the bead channel 405 having varying diameter. An expansion/contraction region 440 after a bead focusing region (upstream, not shown) enables the adjustment of the spacing between beads inside the channel. For example, the expansion/contraction region 440 after the bead focusing region (upstream, not shown) may be used to increase the spacing between beads 422A-D inside the channel (FIG. 4B). Alternatively, an expansion/contraction region after the bead focusing region may be used to decrease the spacing between beads inside the channel. In some embodiments, channel dimensions can decrease over the length of the chip to facilitate filtering of the sample, or for other reasons specific to an application, such as creating fluidic resistance. Channel dimensions can be larger at the input area or at the output area to enable forks or valve systems to be positioned within the channels, or to enable multiple stream lines to be separated and directed to different locations for analysis or collection. In a similar way, cross-sections of various channels can also be changed as needed within a single chip to manipulate stream lines of focused beads for particular applications. In general, any combination of channel geometries, channel cross-sections, and channel dimensions can be included on a single chip as needed to sort, separate, order, and focus beads of a predetermined size or beads of multiple predetermined sizes. For instance, different channel geometries and flow rates can be used for the streams of bead fluid and cell fluid to ensure desired focusing and ordering in each stream prior to droplet generation.

In one embodiment, a straight section of bead channel is formed in the chip near the inlet for transporting and dividing flow lines as the bead is introduced into the microfluidic system. The straight section of each channel can transition to any number of symmetric and/or asymmetric curving channels for focusing beads of a predetermined size as needed.

As shown in FIG. 3, the bead channel 304 has a curved region 305 to decrease the focusing length required and to decrease the device foot-print. In some embodiments, one or both of the cell channels 308, 310 may have a curved region to decrease the focusing length required and to decrease the device foot-print as shown in FIG. 4A. The curved regions may be symmetrically curved. In some embodiments, the curved regions may be asymmetrically curved, such as S-shaped, sinusoidal, or sigmoidal shaped.

In one embodiment, symmetrically, asymmetrically, or continuously curved channels can be provided such as S-shaped, sinusoidal, or sigmoidal shaped cell channel having a rectangular cross-section. Cells of a predetermined size flowing within such channel geometry will be generally focused into two focusing positions corresponding to one or two equilibrium points or potential minimums at a distance from left and right side faces of the channel. An aspect ratio of a sigmoidal channel can be substantially 1 to 1 and/or can vary along a length thereof. For example, the aspect ratio of a sigmoidal channel can vary over the length of the channel between 1 to 1 and 2 to 1 depending on the configuration chosen.

Similar to the bead channel 404 in FIG. 4A having a curving region 438, cell channels 310, 308 each may have a curving region. While asymmetrically curved channels can have various shapes and configurations as needed for a particular application, in one embodiment an asymmetric cell channel can generally have the shape of a wave having large and small turns, where a radius of curvature can change after each inflection point of the wave. Each large and small turn can have a specified width of the channel associated with the turn. Asymmetrically curved channels enable both longitudinal ordering and lateral focusing.

In one embodiment, one-half of a wavelength of the channel wave can have a large curve while one-half of a wavelength of the channel wave can have a small curve. These curves can then be repeated as many times as needed, varying after each inflection point, to provide a specified length of channel with an asymmetric curve. The asymmetrically curved cell channel can also have a rectangular cross-section with an aspect ratio that can vary as needed over the channel length depending on the nature of the asymmetry in the curves. In one embodiment, the aspect ratio can vary between 1 to 1 and 2 to 1. In this case, a single focused stream of cells is created corresponding to a single equilibrium point or potential minimum within the channel.

In other embodiments, asymmetric curving cell channels, in particular an expanding spiral shaped channel can be provided, having a rectangular cross-section with an aspect ratio of substantially 2 to 1. This aspect ratio may vary. In this case, cells are focused into a single stream line a distance away from an inner wall of the channel corresponding to a single equilibrium point or potential minimum within the channel. Examples of systems that include spiral channels are shown in FIGS. 14A and 14B. In some embodiments, the spiral portion of the channel has an outer diameter of 2 to 10 mm, or about 3 to 7 mm, or about 5 mm, or about 10 mm.

Microfluidic devices as described herein may be manufactured using any suitable technology known to one of ordinary skill in the art. For example, such devices and systems may be manufactured using master molds combined with soft lithography techniques. As another example, microfluidic devices or certain components of the microfluidic devices can be manufactured using three-dimensional printing technologies.

In some embodiments, the channels are rectangular in shape. The rectangular-shaped channels may be formed into a variety of geometries described herein, such as straight and curved channels. The channel height to width aspect ratio may be selected to optimize particle ordering. In some embodiments, the rectangular channel aspect ratio is 7:1, or 5:1, or 4:1, or 3:1, or 2:1. In some embodiments, channel height can be in the range of about 0.5 µm to about 200 µm.

In some embodiments, a single chip may have cell channels with different channel geometries. Similar to the bead channel 405 in FIG. 4B having varying diameter, one or both of the cell channels 308, 310 can have varying diameter. An expansion/contraction region after a cell focusing region enables the adjustment of the spacing between cells inside the channel. For example, the expansion/contraction region after the cell focusing region may be used to increase the spacing between cells inside the channel (FIG. 4B). Alternatively, an expansion/contraction region after the cell focusing region may be used to decrease the spacing between cells inside the channel. In some embodiments, channel dimensions can decrease over the length of the chip to facilitate filtering of the sample, or for other reasons specific to an application, such as creating fluidic resistance. Channel dimensions can be larger at the input area or at the output area to enable forks or valve systems to be positioned within the channels, or to enable multiple stream lines to be separated and directed to different locations for analysis or collection. In a similar way, cross-sections of various channels can also be changed as needed within a single chip to manipulate stream lines of focused cells for particular applications. In general, any combination of channel geometries, channel cross-sections, and channel dimensions can be included on a single chip as needed to sort, separate, order, and focus cells of a predetermined size or cells of multiple predetermined sizes. For instance, different channel geometries and flow rates can be used for the streams of cell flow and cell fluid to ensure desired focusing and ordering in each stream prior to droplet generation.

In one embodiment, a straight section of cell channel is formed in the chip near the inlet for transporting and dividing flow lines as the cell is introduced into the microfluidic system. The straight section of each channel can transition to any number of symmetric and/or asymmetric curving channels for focusing cells of a predetermined size as needed.

In some embodiments, the bead channel 304 may have an expansion/contraction region as shown in FIG. 4B which enables the adjustment of the spacing between beads inside the channel. In some embodiments, one or both of the cell channels 308, 310 may have an expansion/contraction region which enables the adjustment of the spacing between beads inside the channel.

As shown in FIG. 3, the cell inlet 306 is configured for introducing cells suspended in a cell fluid into the microfluidic system 300. The oil inlet 312 is configured for introducing droplet generation oil to the droplet generation junction 326 through oil channels 314, 316. The two lateral flows of oil pull droplets from the stream of aqueous bead fluid 324 with the same frequency, or multiple of, that beads reach the droplet generation junction 326. Similarly, the two lateral flows of oil pull droplets from the stream of aqueous cell fluid with the same frequency that cells reach the droplet generation junction 326. At the device outlet 318, droplets exit the microfluidic device 300 in an orderly fashion with every droplet generally encapsulating one bead and/or one cell in the particular design illustrated in FIG. 3. In some embodiments, every droplet generally encapsulates a predetermined number of beads greater or equal to zero and a predetermined number of cells greater or equal to zero. For example, each droplet may have 0, 1, 2, 3, 4, 5, 6, 7, 8, 9, 10, about 15, 20, 30, 40, 50, 60, 70, 80, 90, or 100 beads, and each droplet may have 0, 1, 2, 3, 4, 5, 6, 7, 8, 9, 10, about 15, 20, 30, 40, 50, 60, 70, 80, 90, or 100 cells. In some embodiments, the statistical distribution of beads is less than optimal, e.g., less than 1 bead per droplet. In some embodiments, the statistical distribution of cells is less than optimal, e.g., less than 1 cell per droplet.

The chip 320 can also include a straight section of channel at an output region for analysis of focused particles, collection of focused particles, and/or for recombining stream lines.

As will be appreciated by those skilled in the art, any number of curves or straight sections can be included as needed within the chip for one or more of the bead channel 304, cell channels 308, 310. Additional curved sections of channels can serve as "off-ramps" for focused bead streams to facilitate additional separation based on labels or tags associated with the beads. Channel forks or splits can be included at any positions within the channels to further facilitate manipulation of focused beads as needed for various applications.

Aspect ratios of all channels described above and herein, including straight, symmetric, and asymmetric, can vary as needed from one application to another and/or as many times as needed over the course of a channel. In embodiments illustrated in FIGS. 1-4, aspect ratios are shown as 1 to 1 and 1 to 2; however, a person of ordinary skill will recognize that a variety of aspect ratios could be employed. In addition, the choice of width to height as the standard for determining the aspect ratio is somewhat arbitrary in that the aspect ratio can be taken to be the ratio of a first cross-sectional channel dimension to a second cross-sectional channel dimension, and for rectangular channels this would be either width to height or height to width. By way of further example, the aspect ratio of the channel of FIG. 2B could be expressed as either 2 to 1 or 1 to 2.

Other channel cross-sections can also be included in each of the geometries noted above. Channel cross-sections can include, but are not limited to, circular, triangular, diamond, and hemispherical. Beads of a predetermined size can be focused in each of these exemplary cross-sections, and the focusing positions will be dependent on the geometry of the channel. For example, in a straight channel having a circular or hemispherical cross-section, an annulus or arc of focused beads can be formed within the channel. In a straight channel having a triangular or diamond cross-section, beads can be focused into streams corresponding to focusing positions at a distance from the flat faces of each wall in the geometry. As symmetric and asymmetric curving channels are included having each of the exemplary cross-sections noted above, focusing streams and focusing positions can generally correspond to that described above with respect to the channels having a rectangular cross-section.

In general, there are certain parameters within straight, symmetric, and asymmetric microfluidic channels which lead to optimal ordering and focusing conditions for beads suspended within a sample. These parameters can include, for example, channel geometries, bead size with respect to channel geometries, properties of fluid flow through microfluidic channels, and forces associated with beads flowing within microfluidic channels under laminar flow conditions. Forces acting on the beads may be referred to as inertial forces, however, it is possible that other forces contribute to the focusing and ordering behaviors. Exemplary inertial forces can include, but are not limited to, inertial lift down shear gradients and away from channel walls, Dean drag (viscous drag), pressure drag from Dean flow, and centrifugal forces acting on individual beads.

Multiple Bead Channels in One Chip

Any number of microfluidic bead channels can be formed in the chip in any number of ways. In one exemplary embodiment, a single bead channel is formed on the chip for focusing beads therein. In other exemplary embodiments, a plurality of bead channels can be formed in the chip in various configurations of networks for focusing beads. For example, 2, 4, 6, 8, 10, 12, and more channels can be formed in the chip. Any number of layers can also be included within a microfabricated chip of the system, each layer having multiple bead channels formed therein.

Multiple Cell Channels in One Chip

Any number of microfluidic cell channels can be formed in the chip in any number of ways. In one exemplary embodiment, a single cell channel is formed on the chip for focusing beads therein. In other exemplary embodiments, a plurality of cell channels can be formed in the chip in various configurations of networks for focusing cells. For example, 2, 4, 6, 8, 10, 12, and more channels can be formed in the chip. Any number of layers can also be included within a microfabricated chip of the system, each layer having multiple cell channels formed therein.

Bead Channel Length

The interplay between different parameters including channels size, bead size, flow rate, and fluid properties affect the length required for bead focusing. This interplay in a channel is determined by the following formula:

$$L_f = \frac{\pi \mu h^2}{\rho U_m^2 a^2 f_L}$$

where $L_f$ is the length required for bead focusing; $\mu$ is the dynamic viscosity of the fluid; h is the size of the bead channel (or the hydraulic diameter, or another critical dimension of the channel); $\rho$ is the density of the fluid; $U_m$ is the maximum flow speed; a is the bead diameter; and $f_L$ is a factor, which is in the range of 0.02-0.05 for most cases. Other factors that affect bead channel length include wall features, wall geometries, wall coatings, fluid types, types and concentrations of components in fluids other than beads, bead shapes, bead coating, and bead weight.

Table 1 shows examples of the lengths for bead separation, focusing, and ordering for 30-50 μm beads that are relevant to high throughput single cell experiments in an aqueous liquid with properties close to that of water. The number of focusing positions depends on the inlet configuration (single inlet vs. dual inlet) and their relative flow rates. The first number in that column corresponds to the standard case of having a single inlet.

TABLE 1

Lengths required for bead ordering for 30-50 μm beads.

| Channel dimension (μm) | Aspect ratio | # of focusing positions | 50 μL/min | | 60 μL/min | |
|---|---|---|---|---|---|---|
| | | | 30 μm bead | 50 μm bead | 30 μm bead | 50 μm bead |
| 125 × 125 | 1 | 4 or 3 or 1 | 1.4-3.6 cm | 0.5-1.3 cm | 1.2-3 cm | 0.4-1.1 cm |
| 125 × 100 | 1.25 | 2 or 1 | 0.7-1.8 cm | 0.2-0.7 cm | 0.6-1.5 cm | 0.2-0.6 cm |
| 125 × 80 | 1.56 | 2 or 1 | 0.3-1 cm | 0.1-0.3 cm | 0.3-0.8 cm | 0.1-0.3 cm |

Figure 5A:
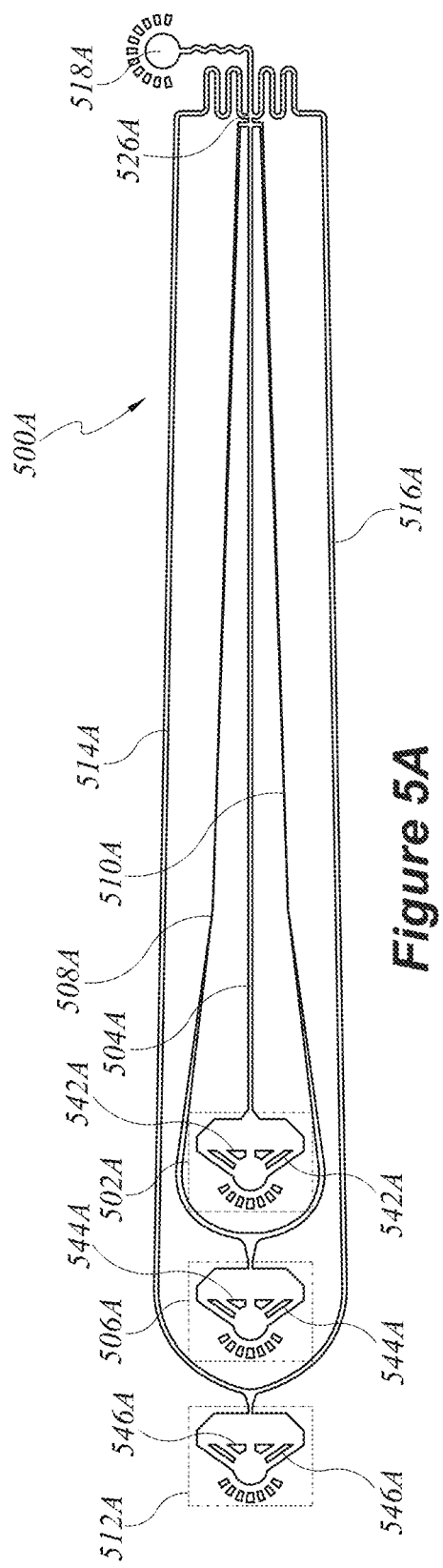

In one embodiment shown in FIG. 5A, a microfluidic system 500A has one straight bead channel that is 125×125 µm in dimension. The microfluidic system 500A includes three inlets: a bead inlet 502A that connects to a single bead channel 504A, a cell inlet 506A that connects to two cell channels 508A, 510A on the two sides of the bead channel 504A, and an oil inlet 512A that connects to two oil channels 514A, 516A which are the outermost channels of the system 500A and are next to the cell channels 508A, 510A away from the bead channel 504A. The microfluidic system 500A generally has one system outlet 518A.

The bead inlet 502A is configured for introducing beads suspended in a bead fluid into the microfluidic system 500A. The beads can be of any density made up of various materials. The bead inlet 502A may have bead filters 542A that prevent undesired particles such as dust from entering and clogging the bead channel 504A. The spacing between the bead filters 542A should be at least 2-3 times the size of the beads so all beads can flow through the bead filters 542A without the risk of clogging the bead channel 504A. For example, the spacing between the bead filters 542A may be 300 µm, e.g., ~5-10 times the bead size.

The cell inlet 506A is configured for introducing cells suspended in a cell fluid into the microfluidic system 500A. The cell inlet 506A may have cell filters 544A that prevent undesired particles such as dust from entering and clogging the cell channels 508A, 510A. The spacing between the cell filters 544A should be at least 2-3 times the size of the cells so all beads can flow through the cell filters 544A without the risk of clogging the cell channels 508A, 510A. For example, the spacing between the cell filters 544A may be 300 µm, e.g., ~5-10 times the cell size.

The oil inlet 512A is configured for introducing droplet generation oil to the droplet generation junction 526A through oil channels 514A, 516A. The oil inlet 512A may have cell filters 546A that prevent undesired particles such as dust from entering and clogging the oil channels 514A, 516A. The spacing between the oil filters 546A depends on the characteristics of the oil used, such as viscosity, so the oil can flow through the oil filters 546A without the risk of clogging the oil channels 514A, 516A. For example, the spacing between the oil filters 546A may be 300 µm.

The two lateral flows of oil pull droplets from the stream of aqueous bead fluid 524A with the same frequency, or multiple of, that beads reach the droplet generation junction 526A because of inertial focusing. Similarly, the two lateral flows of oil pull droplets from the stream of aqueous cell fluid with the same frequency, or multiple of, that cells reach the droplet generation junction 526A because of inertial focusing. At the device outlet 518A, droplets exit the microfluidic device 500 in an orderly fashion with every droplet generally encapsulating one bead and/or one cell in general. The design and input concentrations can be adjusted such that not all droplets have a single bead or cell if needed. For example, each droplet may have 0, 1, 2, 3, 4, 5, 6, 7, 8, 9, 10, about 15, 20, 30, 40, 50, 60, 70, 80, 90, or 100 beads, and each droplet may have 0, 1, 2, 3, 4, 5, 6, 7, 8, 9, 10, about 15, 20, 30, 40, 50, 60, 70, 80, 90, or 100 cells. In some embodiments, the statistical distribution of beads is less than optimal, e.g., less than 1 bead per droplet. In some embodiments, the statistical distribution of cells is less than optimal, i.e. less than 1 cell per droplet.

Figure 5B:
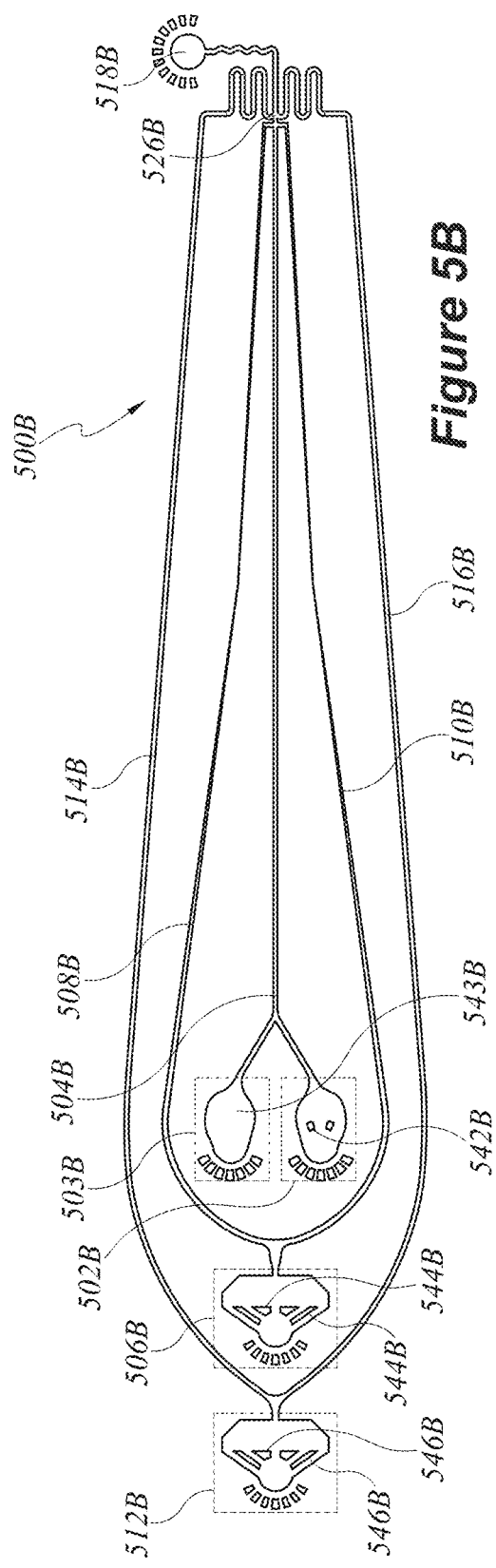

In one embodiment as shown in FIG. 5B, a microfluidic system 500B has one straight bead channel that is 125×125 µm in dimension. The microfluidic system 500B includes four inlets: two bead inlets 502B, 503B that connect to a bead channel 504B (both inlets have bead solution, but only one of them contains beads while the other one is bead-free), a cell inlet 506B that connects to two cell channels 508B, 510B on the two sides of the bead channel 504B, and an oil inlet 512B that connects to two oil channels 514B, 516B which are the outermost channels of the system 500B and are next to the cell channels 508B, 510B away from the bead channel 504B. The dual-inlet co-flow design results in efficient bead ordering. The two cell channels 508B, 510B in this dual-inlet co-flow system are longer in length when compared to the two cell channels 508A, 510A shown in FIG. 5A even though both microfluidic systems have the same bead channel dimension of 125×125 µm. The two oil channels 514B, 516B in this dual-inlet co-flow system are longer in length when compared to the two oil channels 514A, 516A shown in FIG. 5A even though both microfluidic systems have the same bead channel dimension of 125×125 µm. The microfluidic system 500B generally has one system outlet 518B.

The bead inlet 502B is configured for introducing beads suspended in a bead fluid into the microfluidic system 500B. The beads can be of any density made up of various materials. The bead inlet 503B is configured for introducing fluid not containing any beads. The bead inlets 502B, 503B may have bead filters 542B, 543B respectively that prevent undesired particles such as dust from entering and clogging the bead channels 504B. The spacing between the bead filters 542B, 543B should be at least 2-3 times the size of the beads so all beads can flow through the bead filters 542B, 543B without the risk of clogging the bead channel 504B. For example, the spacing between the bead filters 542B, 543B may be 300 µm, e.g., ~5-10 times the bead size.

This dual-inlet co-flow system 500B leads to more efficient ordering of the beads along the channel. Co-flowing with bead-free fluid confines beads on one side of a microchannel resulting in a single line of beads with regular spacing. The cell inlet 506B is configured for introducing cells suspended in a cell fluid into the microfluidic system 500B. The cell inlet 506B may have cell filters 544B that prevent undesired particles such as dust from entering and clogging the cell channels 508B, 510B. The spacing between the cell filters 544B should be at least 2-3 times the size of the cells so all beads can flow through the cell filters 544B without the risk of clogging the cell channels 508B, 510B. For example, the spacing between the cell filters 544B may be 300 µm, e.g., ~5-10 times the cell size.

The oil inlet 512B is configured for introducing droplet generation oil to the droplet generation junction 526B through oil channels 514B, 516B. The oil inlet 512B may have cell filters 546B that prevent undesired particles such as dust from entering and clogging the oil channels 514B, 516B. The spacing between the oil filters 546B depends on the characteristics of the oil used, such as viscosity, so the oil can flow through the oil filters 546B without the risk of clogging the oil channels 514B, 516B. For example, the spacing between the oil filters 546B may be 300 µm.

The two lateral flows of oil pull droplets from the stream of aqueous bead fluid 524B at the same frequency, or multiple of, that beads reach the droplet generation junction 526B due to inertial focusing. Similarly, the two lateral flows of oil pull droplets from the stream of aqueous cell fluid with the same frequency, or multiple of, that cells reach the droplet generation junction 526B due to inertial focusing. At the device outlet 518B, droplets were found to exit the microfluidic device 500 in an orderly fashion with every droplet generally encapsulating one bead and/or one cell in general.

With 50 µL/min bead fluid flow rate and 125×125 µm, the separation of 30 and 50 µm beads required 1.4-3.6 cm and 0.5-1.3 cm respectively. With 60 µL/min bead fluid flow rate, the separation of 30 and 50 µm beads required 1.2-3 cm and 0.4-1.1 cm respectively. The length of the channel can be adjusted for any different bead solution to accommodate the change in focusing length due to changes in fluid density or viscosity.

In one embodiment as shown in FIG. 5C, a microfluidic system 500C has one straight bead channel that is 125×100 µm in dimension. The microfluidic system 500C includes three inlets: a bead inlet 502C that connects to a bead channel 504C, a cell inlet 506C that connects to two cell channels 508C, 510C on the two sides of the bead channel 504C, and an oil inlet 512C that connects to two oil channels 514C, 516C which are the outermost channels of the system 500C and are next to the cell channels 508C, 510C away from the bead channel 504C. The microfluidic system 500C generally has one system outlet 518C.

The bead inlet 504C is configured for introducing beads suspended in a bead fluid into the microfluidic system 500C. The beads can be of any density made up of various materials. The bead inlet 502C may have bead filters 542C that prevent undesired particles such as dust from entering and clogging the bead channel 504C. The spacing between the bead filters 542C should be at least 2-3 times the size of the beads so all beads can flow through the bead filters 542C without the risk of clogging the bead channel 504C. For example, the spacing between the bead filters 542C may be 300 µm, e.g., ~5-10 times the bead size.

The cell inlet 506C is configured for introducing cells suspended in a cell fluid into the microfluidic system 500C. The cell inlet 506C may have cell filters 544C that prevent undesired particles such as dust from entering and clogging the cell channels 508C, 510C. The spacing between the cell filters 544C should be at least 2-3 times the size of the cells so all beads can flow through the cell filters 544C without the risk of clogging the cell channels 508C, 510C. For example, the spacing between the cell filters 544C may be 300 µm, e.g., ~5-10 times the cell size.

The oil inlet 512C is configured for introducing droplet generation oil to the droplet generation junction 526C through oil channels 514C, 516C. The oil inlet 512C may have cell filters 546C that prevent undesired particles such as dust from entering and clogging the oil channels 514C, 516C. The spacing between the oil filters 546C depends on the characteristics of the oil used, such as viscosity, so the oil can flow through the oil filters 546C without the risk of clogging the oil channels 514C, 516C. For example, the spacing between the oil filters 546C may be 300 µm.

The two lateral flows of oil pull droplets from the stream of aqueous bead fluid 524C with the same frequency, or multiple of, that beads reach the droplet generation junction 526C because of inertial focusing. Similarly, the two lateral flows of oil pull droplets from the stream of aqueous cell fluid with the same frequency, or multiple of, that cells reach the droplet generation junction 526C because of inertial focusing. At the device outlet 518C, droplets exit the microfluidic device 500C in an orderly fashion with every droplet generally encapsulating one bead and/or one cell in general.

In one embodiment as shown in FIG. 5D, a microfluidic system 500D has one straight bead channel that is 125×100 µm in dimension. The microfluidic system 500D includes four inlets: two bead inlets 502D, 503D that connect to a bead channel 504D, a cell inlet 506D that connects to two cell channels 508D, 510D on the two sides of the bead channel 504D, and an oil inlet 512D that connects to two oil channels 514D, 516D which are the outermost channels of the system 500D and are next to the cell channels 508D, 510D away from the bead channel 504D. The dual-inlet co-flow design results in efficient bead ordering. The two cell channels 508D, 510D in this dual-inlet co-flow system are longer in length when compared to the two cell channels 508C, 510C shown in FIG. 5A even though both microfluidic systems have the same bead channel dimension of 125×100 µm. The two oil channels 514D, 516D in this dual-inlet co-flow system are longer in length when compared to the two oil channels 514C, 516C shown in FIG. 5C even though both microfluidic systems have the same bead channel dimension of 125×100 µm. The microfluidic system 500D generally has one system outlet 518D.

The bead inlet 502D is configured for introducing beads suspended in a bead fluid into the microfluidic system 500D. The beads can be of any density made up of various materials. The bead inlet 503D is configured for introducing fluid not containing any beads. The bead inlets 502D, 503D may have bead filters 542D, 543D respectively that prevent undesired particles such as dust from entering and clogging the bead channels 504D. The spacing between the bead filters 542D, 543D should be at least 2-3 times the size of the beads so all beads can flow through the bead filters 542D, 543D without the risk of clogging the bead channel 504D. For example, the spacing between the bead filters 542D, 543D may be 300 µm, e.g., ~5-10 times the bead size.

This dual-inlet co-flow system 500D leads to more efficient ordering of the beads along the channel. Co-flowing with bead-free fluid confines beads on one side of a microchannel resulting in a single line of beads with regular spacing. The cell inlet 506D is configured for introducing cells suspended in a cell fluid into the microfluidic system 500D. The cell inlet 506D may have cell filters 544D that prevent undesired particles such as dust from entering and clogging the cell channels 508D, 510D. The spacing between the cell filters 544D should be at least 2-3 times the size of the cells so all beads can flow through the cell filters 544D without the risk of clogging the cell channels 508D, 510D. For example, the spacing between the cell filters 544D may be 300 µm, e.g., ~5-10 times the cell size.

The oil inlet 512D is configured for introducing droplet generation oil to the droplet generation junction 526D through oil channels 514D, 516D. The oil inlet 512D may have cell filters 546D that prevent undesired particles such as dust from entering and clogging the oil channels 514D, 516D. The spacing between the oil filters 546D depends on the characteristics of the oil used, such as viscosity, so the oil can flow through the oil filters 546D without the risk of clogging the oil channels 514D, 516D. For example, the spacing between the oil filters 546A may be 300 µm.

The two lateral flows of oil pull droplets from the stream of aqueous bead fluid 524D with the same frequency, or multiple of, that beads reach the droplet generation junction 526D because of inertial focusing. Similarly, the two lateral flows of oil pull droplets from the stream of aqueous cell fluid with the same frequency, or multiple of, that cells reach the droplet generation junction 526D because of inertial focusing. At the device outlet 518D, droplets exit the microfluidic device 500D in an orderly fashion with every droplet encapsulating one bead and/or one cell in general.

With 50 µL/min bead fluid flow rate and channel dimension of 125×100 µm, the separation of 30 and 50 µm beads require 0.7-1.8 cm and 0.2-0.7 cm respectively. With 60 µL/min bead fluid flow rate, the separation of 30 and 50 µm beads require 0.6-1.5 cm and 0.2-0.6 cm respectively.

In one embodiment as shown in FIG. 5E, a microfluidic system 500E has one straight bead channel that is 125×100 μm in dimension. The microfluidic system 500E includes three inlets: a bead inlet 502E that connects to a bead channel 504E, a cell inlet 506E that connects to two cell channels 508E, 510E on the two sides of the bead channel 504E, and an oil inlet 512E that connects to two oil channels 514E, 516E which are the outermost channels of the system 500E and are next to the cell channels 508E, 510E away from the bead channel 504E. The microfluidic system 500E generally has one system outlet 518E.

The bead inlet 504E is configured for introducing beads suspended in a bead fluid into the microfluidic system 500E. The beads can be of any density made up of various materials. The bead inlet 502E may have bead filters 542E that prevent undesired particles such as dust from entering and clogging the bead channel 504E. The spacing between the bead filters 542E should be at least 2-3 times the size of the beads so all beads can flow through the bead filters 542E without the risk of clogging the bead channel 504E. For example, the spacing between the bead filters 542E may be 300 μm, e.g., ~5-10 times the bead size.

The cell inlet 506E is configured for introducing cells suspended in a cell fluid into the microfluidic system 500E. The cell inlet 506E may have cell filters 544E that prevent undesired particles such as dust from entering and clogging the cell channels 508E, 510E. The spacing between the cell filters 544E should be at least 2-3 times the size of the cells so all beads can flow through the cell filters 544E without the risk of clogging the cell channels 508E, 510E. For example, the spacing between the cell filters 544E may be 300 μm, e.g., ~5-10 times the cell size.

The oil inlet 512E is configured for introducing droplet generation oil to the droplet generation junction 526E through oil channels 514E, 516E. The oil inlet 512E may have cell filters 546E that prevent undesired particles such as dust from entering and clogging the oil channels 514E, 516E. The spacing between the oil filters 546E depends on the characteristics of the oil used, such as viscosity, so the oil can flow through the oil filters 546E without the risk of clogging the oil channels 514F, 516F. For example, the spacing between the oil filters 546E may be 300 μm.

The two lateral flows of oil pull droplets from the stream of aqueous bead fluid 524E with the same frequency, or multiple of, that beads reach the droplet generation junction 526E because of inertial focusing. Similarly, the two lateral flows of oil pull droplets from the stream of aqueous cell fluid with the same frequency, or multiple of, that cells reach the droplet generation junction 526E because of inertial focusing. At the device outlet 518E, droplets exit the microfluidic device 500E in an orderly fashion with every droplet generally encapsulating one bead and/or one cell in general.

In one embodiment as shown in FIG. 5F, a microfluidic system 500F has one straight bead channel that is 125×100 μm in dimension. The microfluidic system 500F includes four inlets: two bead inlets 502F, 503F that connect to a bead channel 504F, a cell inlet 506F that connects to two cell channels 508F, 510F on the two sides of the bead channel 504F, and an oil inlet 512F that connects to two oil channels 514F, 516F which are the outermost channels of the system 500F and are next to the cell channels 508F, 510F away from the bead channel 504F. The dual-inlet co-flow design results in efficient bead ordering. The two cell channels 508F, 510F in this dual-inlet co-flow system are longer in length when compared to the two cell channels 508E, 510E shown in FIG. 5E even though both microfluidic systems have the same bead channel dimension of 125×80 μm. The two oil channels 514F, 516F in this dual-inlet co-flow system are longer in length when compared to the two oil channels 514E, 516E shown in FIG. 5E even though both microfluidic systems have the same bead channel dimension of 125×80 μm. The microfluidic system 500F generally has one system outlet 518F.

The bead inlet 502F is configured for introducing beads suspended in a bead fluid into the microfluidic system 500F. The beads can be of any density made up of various materials. The bead inlet 503F is configured for introducing fluid not containing any beads. The bead inlets 502F, 503F may have bead filters 542F, 543F respectively that prevent undesired particles such as dust from entering and clogging the bead channels 504F. The spacing between the bead filters 542F, 543F should be at least 2-3 times the size of the beads so all beads can flow through the bead filters 542F, 543F without the risk of clogging the bead channel 504F. For example, the spacing between the bead filters 542F, 543F may be 300 μm, e.g., ~5-10 times the bead size.

This dual-inlet co-flow system 500F leads to more efficient ordering of the beads along the channel. Co-flowing with bead-free fluid confines beads on one side of a microchannel resulting in a single line of beads with regular spacing. The cell inlet 506F is configured for introducing cells suspended in a cell fluid into the microfluidic system 500F. The cell inlet 506F may have cell filters 544F that prevent undesired particles such as dust from entering and clogging the cell channels 508F, 510F. The spacing between the cell filters 544F should be at least 2-3 times the size of the cells so all beads can flow through the cell filters 544F without the risk of clogging the cell channels 508F, 510F. For example, the spacing between the cell filters 544F may be 300 μm, e.g., ~5-10 times the cell size.

The oil inlet 512F is configured for introducing droplet generation oil to the droplet generation junction 526F through oil channels 514F, 516F. The oil inlet 512F may have cell filters 546F that prevent undesired particles such as dust from entering and clogging the oil channels 514F, 516F. The spacing between the oil filters 546F depends on the characteristics of the oil used, such as viscosity, so the oil can flow through the oil filters 546F without the risk of clogging the oil channels 514F, 516F. For example, the spacing between the oil filters 546F may be 300 μm.

The two lateral flows of oil pull droplets from the stream of aqueous bead fluid 524F with the same frequency, or multiple of, that beads reach the droplet generation junction 526F because of inertial focusing. Similarly, the two lateral flows of oil pull droplets from the stream of aqueous cell fluid with the same frequency, or multiple of, that cells reach the droplet generation junction 526F because of inertial focusing. At the device outlet 518F, droplets exit the microfluidic device 500F in an orderly fashion with every droplet encapsulating one bead and/or one cell in general.

With 50 μL/min bead fluid flow rate and channel dimension of 125×80 μm, the separation of 30 and 50 μm beads required 0.7-1.8 cm and 0.2-0.7 cm respectively. With 60 μL/min bead fluid flow rate, the separation of 30 and 50 μm beads require 0.6-1.5 cm and 0.2-0.6 cm respectively.

Cell Channel Length

The interplay between different parameters including channel size, cell size, flow rate, and fluid properties affect the length required for cell focusing. This interplay in a channel is determined by the following formula:

$$L_f = \frac{\pi \mu h^2}{\rho U_m a^2 f_L}$$

where $L_f$ is the length required for cell focusing; $\mu$ is the dynamic viscosity of the fluid; h is the size of the cell channel (or the hydraulic diameter, or another critical dimension of the channel); $\rho$ is the density of the fluid; $U_m$ is the maximum flow speed; a is the cell diameter; and $f_L$ is a factor in the range of 0.02-0.05 for most cases. Other factors that affect cell channel length include wall features, wall geometries, wall coatings, fluid types, types and concentrations of components in fluids other than cells, cell shape, cell surface coating, and cell state.

Bead to Volume Ratios

In another aspect of the system, a bead to volume ratio can optionally be manipulated or adjusted for conservation of mass within the channels. In general, separating, ordering, and focusing of beads is, in part, dependent on inter-bead spacing within channels as well as the ratio of bead size to hydrodynamic size of the channel. Various channel geometries described herein may require a predetermined bead to volume ratio of the bead to be focused in order to achieve a required inter-bead spacing and thereby maintain ordering and focusing of that bead. In particular, the bead to volume ratio of a bead suspended within a fluid can be calculated and adjusted as needed to achieve focusing within certain channel geometries. In general, a maximum bead to volume ratio for a specific bead size and channel geometry can be determined using the formula, assuming a rectangular channel and non-overlapping focusing positions:

$$MaxVolumeFraction = \frac{N\pi a^2}{6hw}$$

where N is the number of focusing positions in a channel, a is the focused bead diameter, h is the channel height, and w is the channel width. Thus, beads can be diluted or concentrated to attain a predetermined ratio before and/or during introduction of the bead into the system. Additionally, certain exemplary systems may require the ratio to be adjusted after the bead is introduced into the channels.

Bead to volume ratios of a bead within the channels described herein can have any value sufficient to enable ordering and focusing of beads. In general, the bead to volume ratio can be less than about 50%. In other embodiments, bead to volume ratios can be less than about 40%, 30%, 20%, 10%, 8%, or 6%. More particularly, in some embodiments, bead to volume ratios can be in a range of about 0.001% to about 5%, and can be in a range of about 0.01% to about 4%. Alternatively, the ratio can be in the range of about 0.1% to about 3%. Alternatively, the ratio can be in the range of about 0.5% to about 2%. As will be appreciated by those skilled in the art, the bead to volume ratio of additional or extraneous beads within the bead, apart from the bead to be focused, need not necessarily be considered or adjusted. As will be further appreciated by those skilled in the art, any number of beads may not require any adjustment to the bead to volume ratio of the bead to be focused before, during, and/or after introduction into the system.

Various commonly used techniques for diluting or concentrating beads for adjusting a bead to volume ratio can be used in the embodiments disclosed herein. For example, a bead can be diluted or concentrated in batches before introduction into the system such that the bead ultimately introduced into the system has the required ratio before being introduced through the inlet. In other embodiments, the system can include two or more inlets for introducing the bead simultaneously with a diluent or concentrate to effect dilution or concentration. In this way, the bead to volume ratio can be adjusted within the system, whether adjustment occurs within a chamber before the bead and diluent or concentrate enter the channels or whether adjustment occurs through mixing of the bead and the diluent or concentrate within the channels. In another embodiment, the diluent or concentrate can be introduced into a center portion, fork, or branch of a channel as may be required by various applications after the unadjusted bead has traveled within the channel for some distance. A person skilled in the art will appreciate the variations possible for adjusting the bead to volume ratio of a bead within the embodiments described herein.

Cell to Volume Ratios

In another aspect of the system, a cell to volume ratio can optionally be manipulated or adjusted for conservation of mass within the channels. In general, separating, ordering, and focusing of cells is, in part, dependent on inter-cell spacing within channels as well as the ratio of cell size to hydrodynamic size of the channel. Various channel geometries described herein may require a predetermined cell to volume ratio of the cell to be focused in order to achieve a required inter-cell spacing and thereby maintain ordering and focusing of that cell. In particular, the cell to volume ratio of a cell suspended within a fluid can be calculated and adjusted as needed to achieve focusing within certain channel geometries. In general, a maximum cell to volume ratio for a specific cell size and channel geometry can be determined using the formula, assuming a rectangular channel and non-overlapping focusing positions:

$$MaxVolumeFraction = \frac{N\pi a^2}{6hw}$$

where N is the number of focusing positions in a channel, a is the focused cell diameter, h is the channel height, and w is the channel width. Thus, cells can be diluted or concentrated to attain a predetermined ratio before and/or during introduction of the cell into the system. Additionally, certain exemplary systems may require the ratio to be adjusted after the cell is introduced into the channels.

Cell to volume ratios of a cell within the channels described herein can have any value sufficient to enable ordering and focusing of cells. In general, the cell to volume ratio can be less than about 50%. In other embodiments, cell to volume ratios can be less than about 40%, 30%, 20%, 10%, 8%, or 6%. More particularly, in some embodiments, cell to volume ratios can be in a range of about 0.001% to about 5%, and can be in a range of about 0.01% to about 4%. Alternatively, the ratio can be in the range of about 0.1% to about 3%. Alternatively, the ratio can be in the range of about 0.5% to about 2%. As will be appreciated by those skilled in the art, the cell to volume ratio of additional or extraneous cells within the cell, apart from the cell to be focused, need not necessarily be considered or adjusted. As will be further appreciated by those skilled in the art, any number of cells may not require any adjustment to the cell to volume ratio of the cell to be focused before, during, and/or after introduction into the system.

Various commonly used techniques for diluting or concentrating cells for adjusting a cell to volume ratio can be used in the embodiments disclosed herein. For example, a cell can be diluted or concentrated in batches before introduction into the system such that the cell ultimately introduced into the system has the required ratio before being introduced through the inlet. In other embodiments, the system can include two or more inlets for introducing the cell simultaneously with a diluent or concentrate to effect dilution or concentration. In this way, the cell to volume ratio can be adjusted within the system, whether adjustment occurs within a chamber before the cell and diluent or concentrate enter the channels or whether adjustment occurs through mixing of the cell and the diluent or concentrate within the channels. In another embodiment, the diluent or concentrate can be introduced into a center portion, fork, or branch of a channel as may be required by various applications after the unadjusted cell has traveled within the channel for some distance. A person skilled in the art will appreciate the variations possible for adjusting the cell to volume ratio of a cell within the embodiments described herein.

Inertial Focusing and Droplet Generation

In some embodiments, inertial focusing of beads may be combined with droplet generation to produce extremely high concentrations of droplets and a bead $\lambda$ approaching 1, but avoid having droplets with multiple bead occupancy. $\lambda$ is the average of Poisson distribution, the probability of an event occurring, such as a droplet with one single bead. The effect of Poisson distribution on single-cell analysis and sorting using droplet-based microfluidics has been described in Mazutis et al., Nature Protocols 8:870-91 (2013), which is hereby incorporated by reference. This high concentration of droplets with single bead occupancy allows systems that require such droplets (such as high throughput single cell systems) to improve throughput, for example by 2-25 times, or 5-25 times, or 5-10 times, or 10-20 times, as compared to other encapsulation methods, with decreased error rate (e.g., decreased proportion of droplets with more than one bead).

In some embodiments, inertial focusing of cells may be combined with droplet generation to produce extremely high concentrations of droplets and a cell $\lambda$ approaching 1, but avoid having droplets with multiple cell occupancy. $\lambda$ for cells is the probability of a droplet to have only one single cell. This high concentration of droplets with single cell occupancy allows systems that require such droplets (such as high throughput single cell systems) to improve throughput, for example by 2-25 times, or 5-25 times, or 5-10 times, by 10-20 times, as compared to other encapsulation methods, with decreased error rate (e.g., decreased proportion of droplets with more than one cell).

In some embodiments, focusing, such as inertial focusing, is employed for both A and B particles, such as beads and cells, to overcome the two Poisson distributions, for example, one for beads and one for cells, in double-Poisson statistics. This method creates a system with double-under-dispersed-Poisson statistics and a further enhanced improvement in throughput (e.g., at least 5, 10, 25, 50, or 100×) over non-ordered systems. Embodiments of the invention may be operated continuously and at high volumetric flow rates with cascading outputs. The invention also requires no interactions with mechanical filters or obstacles and requires very low maintenance.

In some embodiments, particles such as beads, nucleic acid fragments, and cells may have statistical distribution other than Poisson, such as normal distribution, log-normal distribution, Pareto distribution, discrete uniform distribution, continuous uniform distribution, Bernoulli distribution, binomial distribution, negative binomial distribution, geometric distribution, hypergeometric distribution, beta-binomial distribution, categorical distribution, multinomial distribution, multivariate hypergeometric distribution, log-Poisson distribution, exponential distribution, Gamma distribution, Rayleigh distribution, Rice distribution, Chi-squared distribution, student's t distribution, F-distribution, Beta distribution, Dirichlet distribution, and Wishart distribution.

Once the proper channel geometry and flow rate are determined for a particular bead (30-50 µm for example), the bead concentration can be adjusted to obtain a large $\lambda$ (still smaller than 1). Then bead fluid is injected into the bead inlet connected to the bead channel at the pre-designated flow rate (for example, 60 µL/min). Subsequently, cells are injected into the cell inlet connection to cell channels at the pre-designated flow rate (for example, 60 µL/min). Finally, the droplet generation oil is injected into the oil inlet connected to the oil channels at the appropriate flow rate (for example, 150-250 µL/min). The third stream (e.g., oil) flow rate may be the same or greater than the flow rates of the bead and cell fluids.

Similar principles can be used to focus and order cells in the cell channel. As a result, one can increase the capture efficiency of the cells to the same order of magnitude as for the beads. The net result from combining the two ordered streams and their improved efficiencies is that both Poisson distributions in the original double-Poisson statistics are overcome to achieve greater improvement (e.g., 50× or 100×) in throughput.

Figure 6:
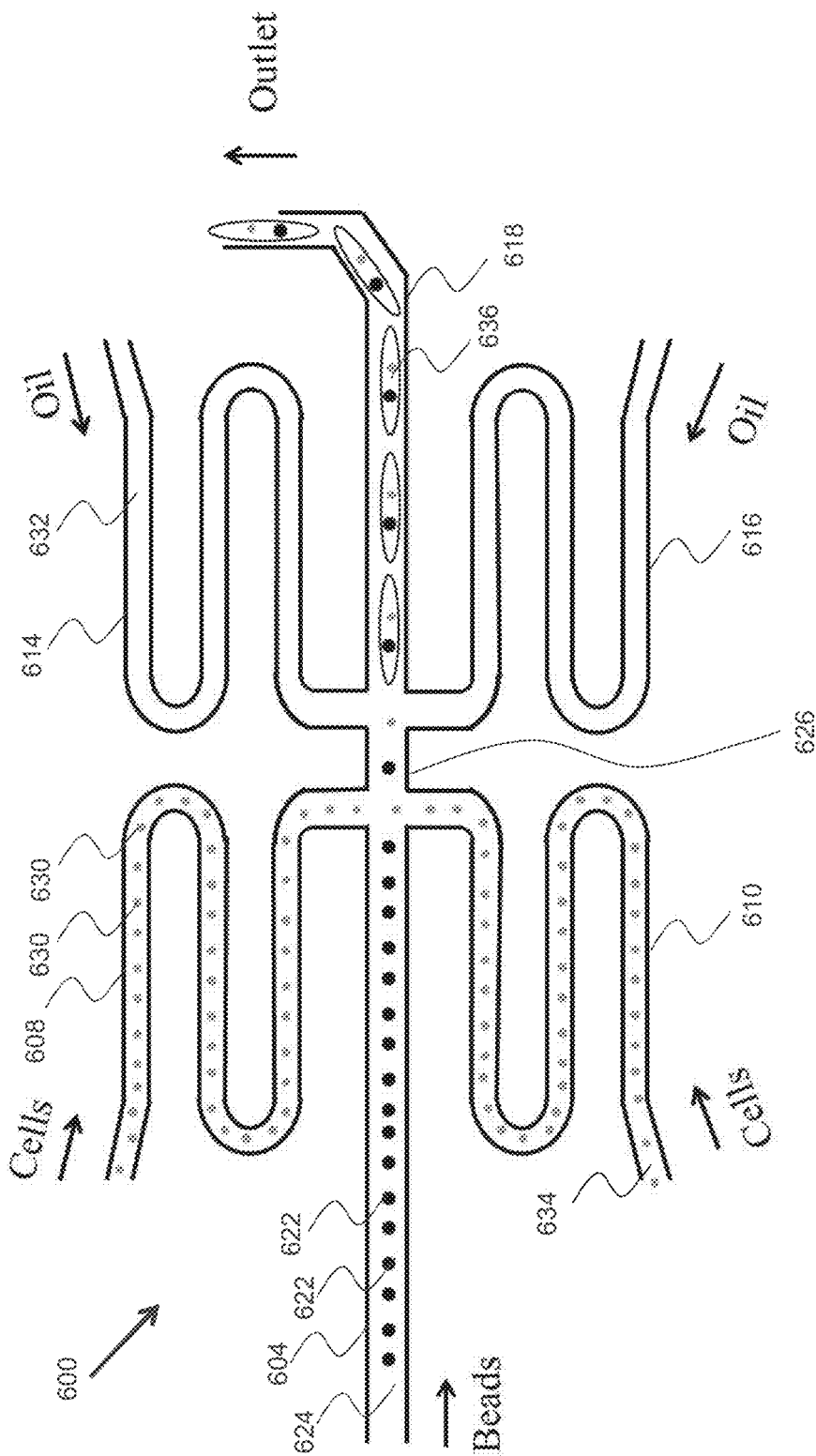
FIG. 6 illustrates a microchannel configuration that allows high efficiency formation of single-cell/single-bead droplets.

FIG. 6 illustrates another embodiment of a microfluidic system 600. As shown, a bead channel 604 may be curved or straight. There may be one or two bead inlets connected to the bead channel 604. The microfluidic system 600 generally includes three inlets: a bead inlet that connects to a bead channel 604, a cell inlet that connects to two cell channels 608, 610 on the two sides of the bead channel 604, and an oil inlet that connects to two oil channels 614, 616 which are the outermost channels of the system 600 and are next to the cell channels 608, 610 away from the bead channel 604. The microfluidic system 600 generally has one system outlet 618. The microfluidic system 600 can be provided on a microfabricated chip with the various channels formed in the chip.

A bead inlet is configured for introducing beads 622 suspended in a bead fluid 624 into the microfluidic system 600. The beads 622 can be of any density made up of various materials. In general, the bead channel 604 can have a specified geometry designed to separate, order, and focus the beads 622 to pre-determined lateral positions in the channel when entering the droplet generation junction 626. These lateral locations correspond to similar flow velocities in the velocity profile of the bead fluid 624 such that, once focused, the beads 622 move at similar speeds and maintain their spacing and do not cross each other. The bead channels used in the microfluidic systems can have various geometries and cross-sections for focusing beads of a predetermined size suspended within a fluid. For example, bead channel 604 may have a square cross-section.

The cell inlet is configured for introducing cells 630 suspended in a cell fluid into the microfluidic system 600. The oil inlet is configured for introducing droplet generation oil 632 to the droplet generation junction 626 through oil channels 614, 616. The two lateral flows of oil pull droplets from the stream of aqueous bead fluid 624 with the same frequency, or multiple of, that beads reach the droplet generation junction 626. Similarly, the two lateral flows of oil pull droplets from the stream of aqueous cell fluid 634 with the same frequency, or multiple of, that cells reach the droplet generation junction 626. The beads 622 are ordered prior to entering the droplet generation junction 626. The cells 630 are ordered prior to entering the droplet generation junction 626. By combining inertial forcing and droplet generation for both beads 622 and cells 630, droplets 636 are formed with one bead and one cell each. This embodiment generates more single-particle droplets (e.g., one cell and one bead) and fewer empty or multiple-particle droplets (e.g., two beads and one cell) than would have been possible from stochastic (Poisson) loading.

Figure 7:
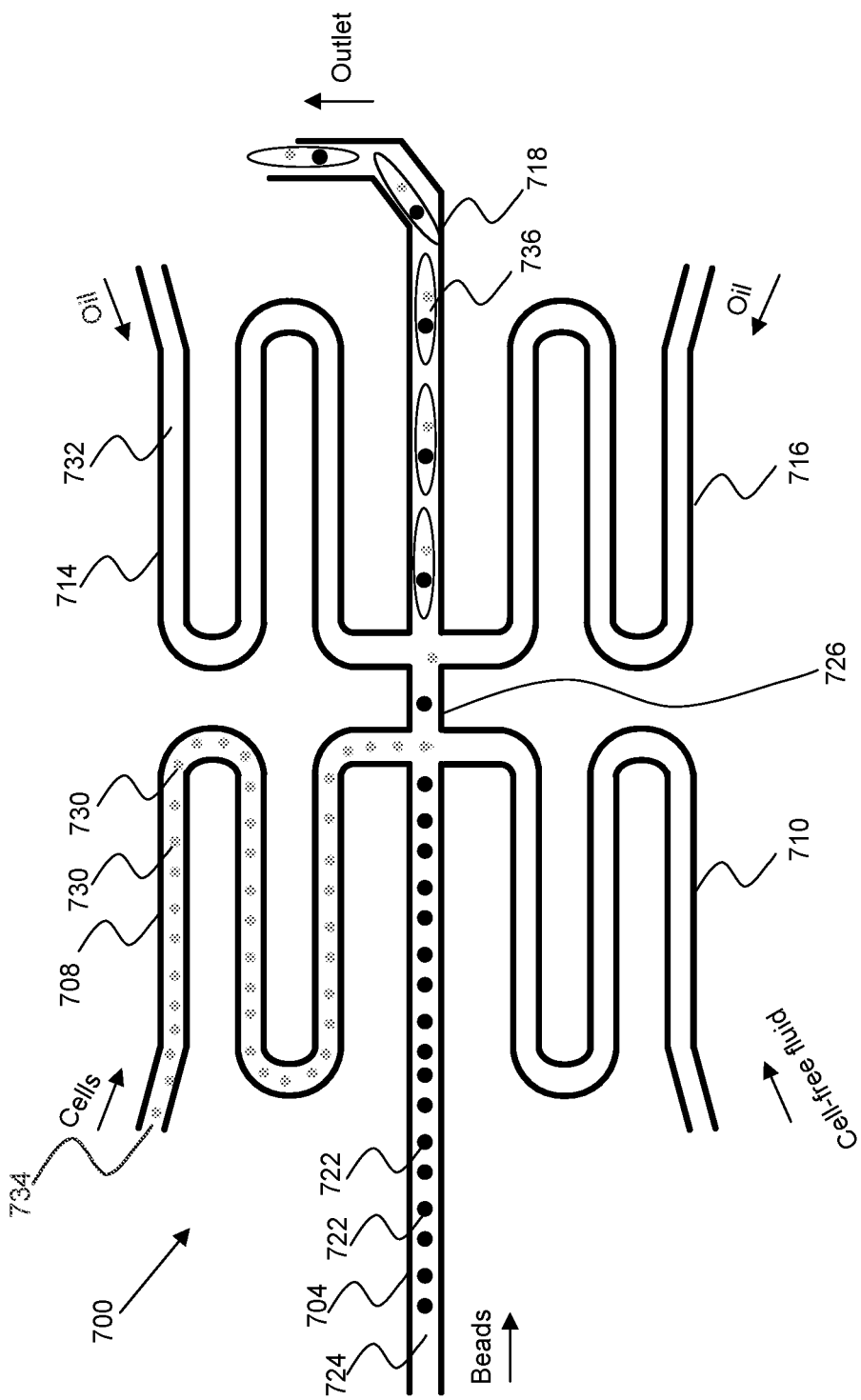
FIG. 7 illustrates a microchannel configuration that allows high efficiency formation of single-cell/single-bead droplets using a dual-inlet co-flow system for cells.

FIG. 7 illustrates another embodiment of a microfluidic system 700. As shown, a bead channel 704 may be curved or straight. There may be one or two bead inlets connected to the bead channel 704. The microfluidic system 700 generally includes three inlets: a bead inlet that connects to a bead channel 704, two cell inlets that connect to two cell channels 708, 710 on the two sides of the bead channel 704, and an oil inlet that connects to two oil channels 714, 716 which are the outermost channels of the system 700 and are next to the cell channels 708, 710 away from the bead channel 704. The microfluidic system 700 generally has one system outlet 718. The microfluidic system 700 can be provided on a microfabricated chip with the various channels formed in the chip.

A bead inlet is configured for introducing beads 722 suspended in a bead fluid 724 into the microfluidic system 700. The beads 722 can be of any density made up of various materials. In general, the bead channel 704 can have a specified geometry designed to separate, order, and focus the beads 722 to pre-determined lateral positions in the channel when entering the droplet generation junction 726. These lateral locations correspond to similar flow velocities in the velocity profile of the bead fluid 724 such that, once focused, the beads 722 move at similar speeds and maintain their spacing and do not cross each other. The bead channels used in the microfluidic systems can have various geometries and cross-sections for focusing beads of a predetermined size suspended within a fluid. For example, bead channel 704 may have a square cross-section.

One cell inlet is configured for introducing cells 730 suspended in a cell fluid into the microfluidic system 700 through cell channel 708. Another cell inlet is configured for introducing a cell-free fluid into the microfluidic system 700. The oil inlet is configured for introducing droplet generation oil 732 to the droplet generation junction 726 through oil channels 714, 716. The two lateral flows of oil pull droplets from the stream of aqueous bead fluid 724 with the same frequency, or multiple of, that beads reach the droplet generation junction 726. Similarly, the two lateral flows of oil pull droplets from the stream of aqueous cell fluid 734 with the same frequency, or multiple of, that cells reach the droplet generation junction 726. The beads 722 are ordered prior to entering the droplet generation junction 726. The cells 730 are ordered prior to entering the droplet generation junction 726. By combining inertial forcing and droplet generation for both beads 722 and cells 730, droplets 736 are formed with one bead and one cell each. This embodiment generates more single-particle droplets (e.g., one bead and one cell) and fewer empty or multiple-particle (e.g., two beads and one cell) droplets than would have been possible from stochastic (Poisson) loading.

Width of Fluidic Channel at Channel Convergence

Figure 15A:
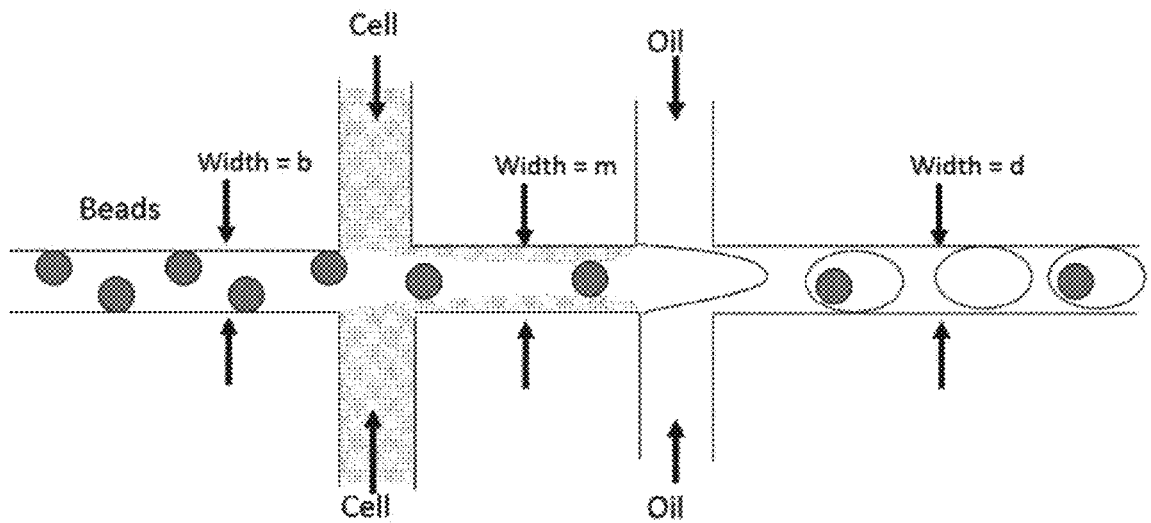
FIGS. 15A-15B depict the configuration of a microfluidic system with respect to the width of the channels after the convergence of two inlet channels.

A design parameter to consider is the width of the fluidic channel after the bead channel and the cell channel meet, and before the droplet formation junction, e.g., width m in FIG. 15A. The bead fluid in this region gets squeezed and diluted by the cell fluid, which increases the distance between the beads and lowers the occupancy rate of beads in droplets. Therefore, the width m can be adjusted to compensate for this phenomenon, and in turn increase the bead's encapsulation efficiency in the droplets.

Figure 15B:
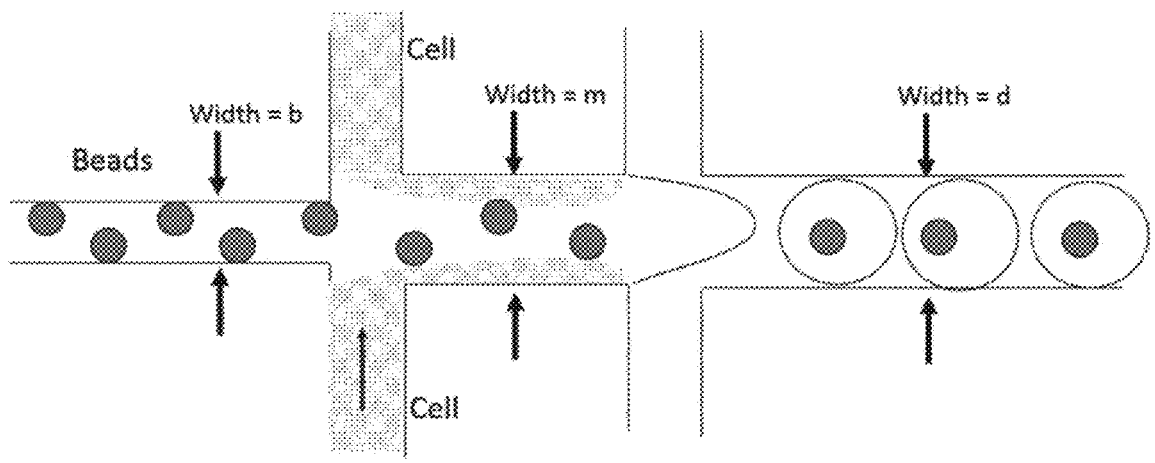

To address this, the width of the channel m was increased proportionally to the ratio of the flow rate of bead and cell fluids. In one example, the flow rate for the bead fluid was 30 μL/min and the flow rate for cell fluid was 30 μL/min. In this example, to maintain the same distance between beads after the bead fluid is combined with the cell fluid, the ratio of channel width m/b was increased by 200% (since the ratio of total bead and cell fluids flowrate and bead fluid flow rate=60/30). In addition, the width of the fluidic channel post droplet generation junction, e.g., width d, was also wider by ~200% as shown in FIG. 15B. The ratio of the channel width m/b can vary from 1 to as high as 3 depending on the flow rates of the bead and cell fluids.

Channel Modification to Address Bead Clumping

Figure 16:
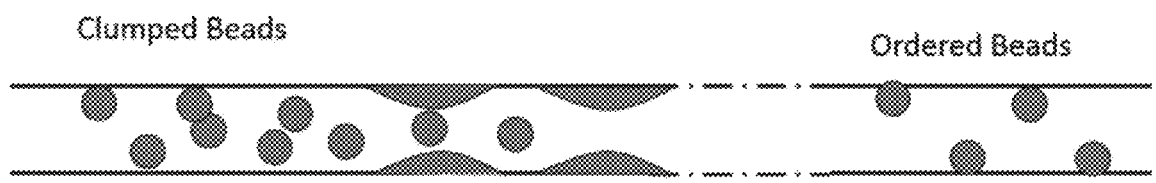
FIG. 16 depicts an embodiment of a microfluidic system in which intra-channel structures or constrictions that can de-clump a pool of clumped beads to yield ordered beads.

Clumped beads may adversely affect single bead droplet rates. Additionally, clumped beads may require a longer channel length to achieve bead ordering. Therefore, in one embodiment, non-clumped beads are fed into the bead fluidic channel. Feeding non-clumped beads can be achieved by introducing structures or constrictions at the bead inlet or at the beginning of the bead channel to disrupt the clumps of beads. For example, in FIG. 16, intra-channel constrictions are shown as wavy structures. In this example, the channel width at the constriction is greater than the bead diameter, but less the twice the bead diameter.

Nucleic Acid Sequencing

The application of inertial forcing and droplet generation to beads, cells, and nucleic acids is suitable for applications in any type of DNA sequence analysis, including long-read DNA sequencing and single cell sequencing. The generation of droplets each with one bead and one cell enable the continuous high throughput analysis and sequencing of single cells.

Figure 8:
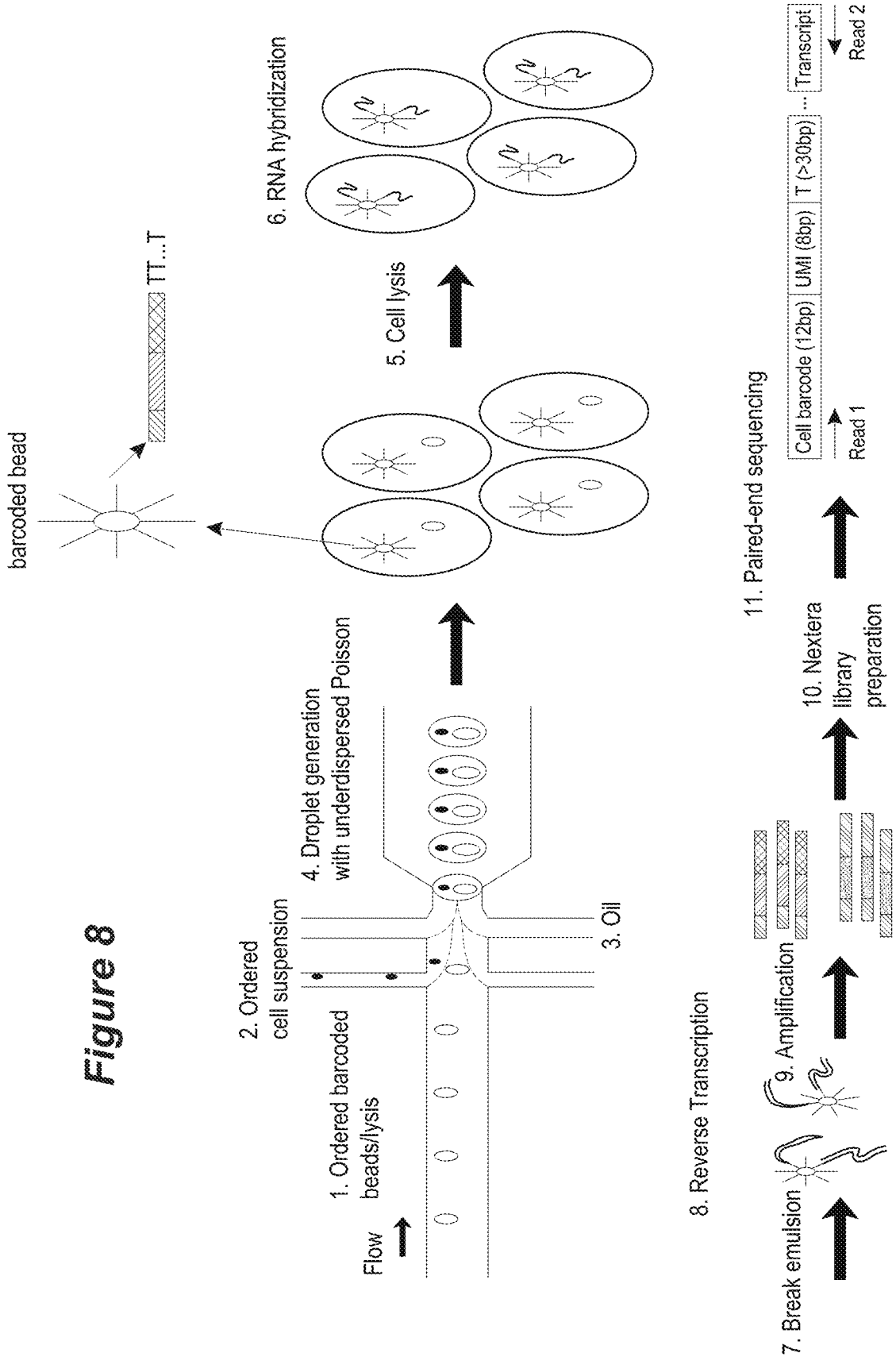
FIG. 8 illustrates the use of an embodiment of the system for single cell sequencing.

In one embodiment shown in FIG. 8, a microchannel device is designed to generate droplets each containing a single cell and a single bead. Step 1, the microchannel device is configured to separate, order, and focus streams of barcoded beads to one or more focusing positions within a channel flow field. Step 2, the microchannel device is configured to separate, order, and focus streams of cells to one or more focusing positions within a channel flow field. Step 3, the microchannel device receives an oil as another input. Step 4, by combining the ordered barcoded bead, the ordered cells, and an oil, the microchannel device generates droplets with a-double-underdispersed-Poisson statistics, where each droplet contains one bead and one cell. In some embodiments, the design of the microfluidic device, concentrations of beads, cells, other components of the bead fluid and cell fluid, the type of oil, and the flow rates of the bead fluid, cell fluid, and oil are designed so the microfluidic device generates droplets with any desired numbers of beads and cells per droplet. In some embodiments, the statistical distribution of beads is less than optimal, e.g., less than 1 bead per droplet. In some embodiments, the statistical distribution of cells is less than optimal, e.g., less than 1 cell per droplet. This ratio is beneficial for single cell sequencing applications, as a high proportion of populated droplets contain one cell and one bead, and low proportions of droplets contain one cell and no bead, one bead and no cell, or are empty. Thus, a high proportion of cells will be sequenced.

Each barcoded bead shown in FIG. 8 includes numerous nucleotide fragments, and each nucleotide fragment includes a unique DNA tag (e.g., a barcode, the same on all fragments on a single bead), an index (e.g., a unique molecular identifier, different for each fragment on a single bead), along with a capture region comprising a poly-T tail. This construct makes each bead uniquely tagged in comparison to all other beads being used in the device. For example, each of the four droplets shown in FIG. 8 contains one barcoded bead and one cell. Each of the four barcoded beads is uniquely tagged in comparison to the other three barcoded beads. In some embodiments, the poly-T region may be at an internal region of a nucleotide fragment rather than at the tail region of the nucleotide fragment.

In some embodiments, the bead fluid contains a lysis buffer. Step 5, when a cell and a bead become encapsulated into a droplet and the droplet contains lysis buffer, the cell is lysed. After cell lysis at Step 6, each polyadenylated mRNA in each cell becomes bound to the poly-T tail of a nucleotide fragment on the bead, e.g., hybridization between the nucleotide fragment on the bead and the mRNA. Because of the index region, each mRNA from a cell is uniquely tagged in comparison to other mRNA sequences from the cell. And because of the unique DNA tag, each mRNA from a cell is uniquely tagged in comparison to other mRNAs from other cells.

At Step 7, the emulsion of droplets is broken, releasing beads with hybridized nucleotide fragments and mRNA into solution. Resolution of an emulsion may be accomplished by any suitable means, such as by chemical, physical, or electrolytic means. The means may be chosen to be compatible with the particles in the system, or may be chosen to degrade one or both particle types to allow for subsequent analysis, such as sequencing.

At Step 8, the hybridized nucleotide fragments and mRNAs are subject to reverse transcription using a reverse transcriptase to generate cDNAs.

At Step 9, the cDNAs are subject to amplification using the appropriate primers and polymerase. Thus, each cDNA strand formed has an original mRNA sequence along with the unique DNA tag of the bead that was encapsulated with the cell and the unique index from the nucleotide fragment on the bead.

At Step 10, the amplified cDNAs are subject to library preparation, such as Nextera library preparation.

At Step 11, the nucleotides in the library are subject to sequencing, such as paired-end sequencing. Because each mRNA from a cell is uniquely tagged in comparison to other mRNAs from the same cell and mRNAs from other cells, sequencing reactions of the library can be performed in bulk, with cDNA samples from many cells being sequenced, but each uniquely tagged so that they can be sorted from one another. Each library sequence has a unique DNA tag or barcode, an index, and a capture region comprising a poly-T region. The index can be used to correct for amplification errors and avoid multiple-counting of a single molecule. After sequencing, the mRNA population and expression level of individual cells can be determined.

One of ordinary skill in the art will recognize that the reverse transcription, amplification, and sequencing steps discussed herein may be accomplished using methods known in the field.

In certain of these methods, the beads include nucleotide fragments. The nucleotide fragments include a barcode region, an index region, and a capture region comprising a poly-T tail. The barcode region of each nucleotide fragment is at least about six nucleotides in length, or is about six to eight nucleotides in length, or is about six nucleotides in length. The index region of each nucleotide fragment is at least about four nucleotides in length, or is about four to ten nucleotides in length, or is about four nucleotides in length. The capture region includes poly-T nucleotides and is at least about ten nucleotides in length, or is about ten to twenty nucleotides in length, or is about ten nucleotides in length.

Particle Analysis

In another embodiment, an analysis region is provided in proximity to the output channel to monitor, sort, count, image, or otherwise analyze the localized and focused streams of particles. In one embodiment, a chip can be, or be part of, a particle enumerating system. In particular, an analysis region, in which the particles have been focused and ordered, could be subject to interrogation by a detector for the purpose of counting the particles. A variety of detectors are discussed below, as are systems for tagging particles for detection, and these elements can also be used for enumeration.

Types of Particles

Any number of different types of particles can be introduced into the system for particle focusing and should not be limited to those particle types described herein. Particles can be made of or derived from various materials, and can have different properties such as a density higher equal or lower than water.

Particles suspended within a sample can have any size which allows them to be ordered and focused within the microfluidic channels described herein. For example, particles can have a hydrodynamic size that is in the range of about 100 microns to about 0.01 microns. Alternatively, particles can have a hydrodynamic size that is in the range of about 20 microns to about 0.1 microns. Alternatively, particles can have a hydrodynamic size that is in the range of about 10 microns to about 1 micron. It will be appreciated that particle size is only limited by channel geometry, and particles both larger and smaller than the above-described ranges can be ordered and focused within predetermined channel geometries having laminar flow conditions.

Particles can be cells or nucleic acids. Cells and nucleic acids can be derived from any biological system, such as animal, bacteria, virus, fungus, or plant, and any source such as water, food, soil, or air.

In some embodiments, a solid sample serves as a source of particles of interest. If a solid sample is obtained, such as a tissue sample or soil sample, the solid sample can be liquefied or solubilized prior to subsequent introduction into the system. If a gas sample is obtained, it may be liquefied or solubilized as well. For example, the sample may consist of bubbles of oil or other kinds of liquids as the particles suspended in an aqueous solution.

In some embodiments, a sample can be derived from an animal such as a mammal. The mammal can be a human. Exemplary fluid samples containing particles derived from an animal can include, but are not limited to, whole blood, partitioned blood, blood components, sweat, tears, ear flow, sputum, bone marrow suspension, lymph, urine, brain fluid, cerebrospinal fluid, saliva, mucous, vaginal fluid, semen, ascites, milk, secretions of the respiratory, intestinal and genitourinary tracts, and amniotic fluid. In other embodiments, exemplary samples can include fluids that are introduced into a human body and then removed again for analysis, including all forms of lavage such as antiseptic, bronchoalveolar, gastric, peritoneal, cervical, arthroscopic, ductal, nasal, and ear lavages. Exemplary particles can include any particles contained within the fluids noted herein and can be both rigid and deformable. In particular, particles can include, but are not limited to, cells, alive or fixed, such as adult red blood cells, fetal red blood cells, trophoblasts, fetal fibroblasts, white blood cells, epithelial cells, tumor cells, cancer cells, hematopoeitic stem cells, bacterial cells, mammalian cells, protists, plant cells, neutrophils, T lymphocytes, CD4+ cells, B lymphocytes, monocytes, eosinophils, natural killers, basophils, dendritic cells, circulating endothelial, antigen specific T-cells, and fungal cells. In some embodiments, particles may include or be derived from viruses, organelles, or liposomes.

Particles can be non-cellular or non-biological items, or synthetic items, including such as beads, droplets, nanoparticles, or molecular complexes. Different particle forms include but are not limited to solid beads, porous solid beads, hydrogel beads, double- or multi-emulsions, deformable or non-deformable beads, spherical or complex-shaped beads. In some embodiments, particles are beads, such as beads suitable for oligonucleotide (DNA or RNA) sequencing applications. Beads may be synthetic polymer beads, such as beads of polystyrene, sepharose, agarose, polyacrylamide, chitosan, gelatin, and the like. Beads may also include magnetic beads. Beads may be of any diameter, such as 10 to 100 μm, or 10 to 20 μm, or 25 to 50 μm, or 30 μm, or 40 μm.

Particles may be suspended generally in any suspensions, liquids, and/or fluids with at least one type of particle, cell, droplet, or otherwise, disposed therein. Further, focusing can produce a flux of particles enriched in a first particle based on size.

In some embodiments, one or more particles, such as cells, may stick, group, or clump together within a sample. In such a configuration, a grouping or clumping of particles can be considered to be "a particle" for the purposes of systems of the invention. More particularly, a grouping or clumping of particles may act and be treated as a single particle within channels of the invention described herein and can thus be sorted, ordered, separated, and focused in the same way as a single particle.

Particles from non-biological samples can include, for example, any number of various industrial and commercial samples suitable for particle separating, ordering, and focusing. Exemplary industrial samples that contain particles that can be introduced into the system can include, but are not limited to, emulsions, two-phase chemical solutions (for example, solid-liquid, liquid-liquid, and gas-liquid chemical process samples), waste water, bioprocess particulates, and food industry samples such as juices, pulps, seeds, etc. Similarly, exemplary commercial samples that contain particles can include, but are not limited to, bacteria/parasite contaminated water, water with particulates such as coffee grounds and tea particles, cosmetics, lubricants, and pigments.

In some embodiments, particles from a fluid sample obtained from an animal is directly applied to the system described herein, while in other embodiments, the sample is pretreated or processed prior to being delivered to a system of the invention. For example, a fluid drawn from an animal can be treated with one or more reagents prior to delivery to the system or it can be collected into a container that is preloaded with such a reagent. Exemplary reagents can include, but are not limited to, a stabilizing reagent, a preservative, a fixant, a lysing reagent, a diluent, an anti-apoptotic reagent, an anti-coagulation reagent, an anti-thrombotic reagent, magnetic or electric property regulating reagents, a size altering reagent, a buffering reagent, an osmolality regulating reagent, a pH regulating reagent, and/or a cross-linking agent.

Suitable carrier fluids for the particle channels include aqueous solutions, water, buffer solutions, salt-based solutions, and mixtures thereof. Where the particles are cells, the cell carrier fluid is compatible with cells, such as an aqueous buffer, for example, phosphate-buffered saline. Where the particles are beads, the carrier fluid may be water or an aqueous solution optionally further comprising a chemical agent that provides the desired amount of expansion of the polymer bead. In other embodiments, the bead fluid comprises a cell lysis buffer.

Suitable oils include organic oils, such as olive oil or vegetable oil, or mineral oils, or silicone oils (such as derivatives of octamethyltrisiloxane), or perfluorinated oils (such as Fluorinert FC-40) or long chain hydrocarbon acids, such as oleic acid or dioctyl phthalate. Oils used in the third stream may also comprise stabilizers or surfactants.

Flow rates for the first and second particle streams may be the same or different. Flow rates may be in the range of about 10 to 75 μL/min, or about 10 to 50 μL/min, or about 10 to 35 μL/min, or about 40 to 75 μL/min, or about 10, 15, 20, 25, 30, 35, 40, 45, 50, 55, 60, 65, or 75 μL/min. In some embodiments, the bead stream flow rate is higher than the cell stream flow rate.

The particle fluids may be introduced to the system with a particular particle concentration. For example, particles may be present in the particle fluids at a concentration of 100 to 3500 per μL, or 100 to 750 per μL, or 100 to 600 per μL, or 100 to 300 per μL, or 500 to 3000 per μL, or 1000 to 3000 per μL. In some embodiments, the particles are cells, which are present in the cell fluid at a concentration of 100 to 750 per μL, or 100 to 300 per μL. In some embodiments, particles are beads, which are present in the bead fluid at a concentration of 500 to 3000 per μL or 1000 to 3000 per μL.

In some embodiments, particle A or bead occupancy rates for droplets produced by the systems described herein are at least 60, 70, 75, 80, 85, or 90%. In some embodiments, particle B or cell occupancy rates for droplets produced by the systems described herein are at least 10, 20, 30, 40, 50, 60, 70, 80, or 90%.

EXAMPLES

Some aspects of the embodiments discussed above are disclosed in further detail in the following example, which is not in any way intended to limit the scope of the present disclosure.

Example 1

Focusing of 30 μm-Diameter Beads to the Four Focusing Positions in a Straight Square Channel within a Length of 1.2-3 cm from the Bead Fluid Inlet This example demonstrates that the focusing of 30 μm-diameter beads to the four focusing positions in a square channel was achieved within a length of 1.2-3 cm from the bead fluid inlet.

Figure 9:
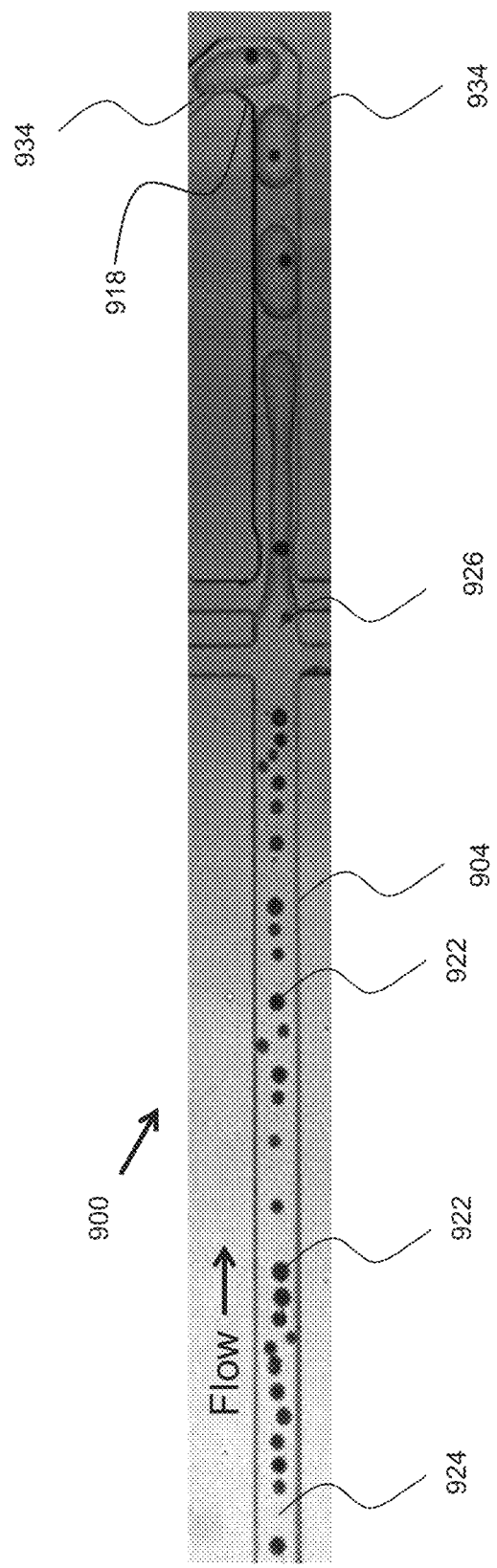
FIG. 9 is an image of a device according to embodiments which shows the focusing of 30 μm diameter beads to the four focusing positions in a square channel within a length of 1.2-3 cm from the bead fluid inlet.

Using the properties of fluid-bead and bead-bead interactions in the bead channels, a set of microfluidic devices were designed that allowed for beads of different sizes to focus and order prior to entering the droplet generation junction. Referring to FIG. 9, a microfluidic device 900 with a 125×125 μm straight bead channel 904 was made that focused 30 μm diameter beads to their four focusing positions within a length of 1.2-3 cm from the inlet at the flow rate of 60 μL/min. At 20 μL/min of bead fluid 924 flow rate, no particle ordering was observed and beads were randomly distributed at the droplet generation junction. At 60 μL/min of bead fluid 924 flow rate, the beads 922 were ordered prior to entering the droplet generation junction 926. At the device outlet 918, droplets 934 exited the microfluidic device 900 in an orderly fashion with every droplet encapsulating one bead in general. The combination of bead channel dimension, flow rate generated more single-particle droplets and fewer empty or multiple-particle droplets than would have been possible from stochastic (Poisson) loading.

Altogether, these data indicate that the focusing of 30 μm-diameter beads to the four focusing positions in a square channel is achievable within a length of 1.2-3 cm from the bead fluid inlet.

Example 2

Focusing of ≤40 μm-Diameter Beads to Achieve One Bead Per Droplet

This example demonstrates that focusing of ≤40 μm-diameter beads to the two focusing positions in a rectangular microchannel was achieved within a length of 1.2-3 cm from the bead fluid inlet. This configuration of device resulted in the vast majority of droplets containing one bead per droplet.

Using the properties of fluid-bead and bead-bead interactions in the bead channels, a microfluidic device was designed that allowed for beads of 40 μm or less (for example, 20 to 40 μm, or 30 μm) to focus and order prior to entering a droplet generation junction of the microfluidic device. The microfluidic device had a bead channel with a cross-sectional dimension of 100×125 μm that focused the beads to their two focusing positions within a length of approximately 1.2-3 cm from the inlet. The flow rate of the bead solution and the cell solution were set at 50 μL/min. The flow rate of the oil was set at 300 μL/min, which resulted in approximately ~4000 droplets per second being created. At these flow rates, clear bead ordering was observed and an ordered stream of beads was observed entering the droplet generation junction. Only about 0.6% of the resulting droplets had more than one bead within a droplet and a 90% reduction compared to Poisson statistics.

Altogether, these data indicate that the focusing of beads to the two focusing positions in a rectangular channel is achievable within a length of 1.2-3 cm from the bead fluid inlet.

Example 3

Focusing of 40 μm-Diameter Polystyrene Beads to Achieve One Bead Per Droplet

Figure 10:
FIG. 10 is an image of a device according to embodiments that shows focusing and ordering of 40 μm diameter polystyrene beads in a rectangular straight microchannel prior to droplet formation.

This example demonstrates that focusing of 40 μm-diameter polystyrene beads to the two focusing positions in a rectangular microchannel was achieved within a length of 1.2-3 cm from the bead fluid inlet. As shown in FIG. 10, this configuration of device resulted in the vast majority of droplets containing one bead per droplet.

Using the properties of fluid-bead and bead-bead interactions in the bead channels, a microfluidic device was designed that allowed for beads of 40 μm or less to focus and order prior to entering a droplet generation junction of the microfluidic device. The microfluidic device had a bead channel with a cross-sectional dimension of 75×125 μm that focused the beads to their two focusing positions within a length of approximately 1.2-3 cm from the inlet. The flow rate of the bead solution was set at 50 μL/min and the cell solution were set at 10 μL/min. The input bead concentration was set at 2000 beads/μL. The flow rate of the oil was set at 250 μL/min, which resulted in approximately ~2000 droplets per second being created. At these flow rates, clear bead ordering was observed and an ordered stream of beads was observed entering the droplet generation junction (FIG. 10). Only about 2.7% of the resulting droplets had more than one bead within a droplet and a 83.3% reduction compared to Poisson statistics. Results for the distribution of beads inside droplets for other flow rate conditions are shown in Table 2.

TABLE 2

Percentage of droplets with one polystyrene bead only ("Desired"), two or more polystyrene beads ("Error"), and empty droplets ("Empty") for various operating conditions, with a comparison to Poisson distribution.

| Bead Fluid Flow Rate (μL/min) | Cell Fluid Flow Rate (μL/min) | Oil Flow Rate (μL/min) | Desired Droplets (%) | Error Droplets (%) | Empty Droplets (%) |
|---|---|---|---|---|---|
| 40 | 5 | 250 | 73.4 | 8.4 | 18.2 |
| 40 | 10 | 250 | 64.3 | 10.8 | 24.9 |
| 50 | 10 | 250 | 72.9 | 2.7 | 24.4 |
| Poisson | Poisson | Poisson | 35.0 | 16.2 | 48.8 |

Altogether, these data indicate that the focusing of 40 μm-diameter polystyrene beads to the two focusing positions in a rectangular channel is achievable within a length of 1.2-3 cm from the bead fluid inlet.

Example 4

Figure 11:
FIG. 11 is an image of a device according to embodiments that shows focusing and ordering of 30 to 40 μm PMMA beads in a rectangular straight microchannel prior to droplet formation.

Focusing of 40 μm-Diameter Polymethylmethacrylate Beads to Achieve One Bead Per Droplet This example demonstrates that focusing of 30 to 40 μm-diameter polymethylmethacrylate (PMMA) beads to the two focusing positions in a rectangular microchannel was achieved within a length of 1.2-3 cm from the bead fluid inlet. As shown in FIG. 11, this configuration of device resulted in the vast majority of droplets containing one bead per droplet.

Using the properties of fluid-bead and bead-bead interactions in the bead channels, a microfluidic device was designed that allowed for PMMA beads of 40 μm or less to focus and order prior to entering a droplet generation junction of the microfluidic device. The microfluidic device had a bead channel with a cross-sectional dimension of 75×125 μm that focused the beads to their two focusing positions within a length of approximately 1.2-3 cm from the inlet. The flow rate of the bead solution was set at 60 μL/min and the cell solution were set at 10 μL/min. The input bead concentration was set at 1500 beads/μL. The flow rate of the oil was set at 260 μL/min, which resulted in approximately ~2000 droplets per second being created. At these flow rates, as shown in FIG. 11, clear bead ordering was observed and an ordered stream of beads was observed entering the droplet generation junction. As shown in Table 3, only about 5.3% of the resulting droplets had more than one bead within a droplet and a 67.3% reduction compared to Poisson statistics.

TABLE 3

Distribution of beads inside droplets for other flow rate conditions.

| Bead Fluid Flow Rate (μL/min) | Cell Fluid Flow Rate (μL/min) | Oil Flow Rate (μL/min) | Desired Droplets (%) | Error Droplets (%) | Empty Droplets (%) |
|---|---|---|---|---|---|
| 50 | 10 | 250 | 57.3 | 13.4 | 29.3 |
| 60 | 10 | 260 | 65.6 | 5.3 | 29.1 |

Altogether, these data indicate that the focusing of 30 to 40 µm-diameter PMMA beads to the two focusing positions in a rectangular channel is achievable within a length of 1.2-3 cm from the bead fluid inlet.

Example 5

Focusing of 40 µm-Diameter Sepharose Gel Beads to Achieve One Bead Per Droplet

Figure 12A:
FIGS. 12A-12B show the focusing and ordering of 30 to 40 μm sepharose gel beads in a straight rectangular microchannel prior to droplet formation.
Figure 12B:

This example demonstrates that focusing of 30 to 40 µm-diameter sepharose gel beads to the two focusing positions in a straight rectangular microchannel was achieved within a length of 1.2-3 cm from the bead fluid inlet. As shown in FIGS. 12A and 12B, this configuration of device resulted in the vast majority of droplets containing one bead per droplet. The same approach can be used for other types if porous polymer gel beads, such as polyacrylamide, agarose, chitosan, gelatin, and the like.

Using the properties of fluid-bead and bead-bead interactions in the bead channels, a microfluidic device was designed that allowed for beads of 40 µm or less to focus and order prior to entering a droplet generation junction of the microfluidic device. The microfluidic device had a bead channel with a cross-sectional dimension of 75×125 µm that focused the beads to their two focusing positions within a length of approximately 1.2-3 cm from the inlet. The flow rate of the bead solution was set at 60 µL/min and the cell solution were set at 10 µL/min. The input bead concentration was set at 2100 beads/µL. The flow rate of the oil was set at 270 µL/min, which resulted in approximately ~2500 droplets per second being created. As shown in FIGS. 12A and 12B, at these flow rates, clear bead ordering was observed and an ordered stream of beads was observed entering the droplet generation junction. As shown in Table 4, only about 6.1% of the resulting droplets had more than one bead within a droplet and a 62.3% reduction compared to Poisson statistics.

TABLE 4

Distribution of beads inside droplets for other flow rate conditions

| Bead Fluid Flow Rate (µL/min) | Cell Fluid Flow Rate (µL/min) | Oil Flow Rate (µL/min) | Desired Droplets (%) | Error Droplets (%) | Empty Droplets (%) |
|---|---|---|---|---|---|
| 35 | 35 | 270 | 44.4 | 3.7 | 52.0 |
| 35 | 35 | 280 | 39.0 | 4.0 | 57.1 |
| 40 | 35 | 280 | 45.0 | 3.2 | 51.8 |
| 45 | 40 | 250 | 55.4 | 5.9 | 38.7 |
| 50 | 10 | 240 | 69.8 | 9.5 | 20.6 |
| 60 | 10 | 270 | 70.0 | 6.1 | 24.0 |

Altogether, these data indicate that the focusing of 30 to 40 µm-diameter sepharose gel beads to the two focusing positions in a rectangular channel is achievable within a length of 1.2-3 cm from the bead fluid inlet.

Example 6

Focusing of 40 µm-Diameter Sepharose Gel Beads to Achieve One Bead Per Droplet

Figure 13A:
FIGS. 13A-13B show the focusing and ordering of 30 to 40 μm sepharose gel beads in a spiral rectangular microchannel prior to droplet formation.
Figure 13B:

This example demonstrates that focusing of 30 to 40 µm-diameter sepharose gel beads to the two focusing positions in a spiral rectangular microchannel was achieved within a length of 1.2-3 cm from the bead fluid inlet. As shown in FIGS. 13A and 13B, this configuration of device resulted in the vast majority of droplets containing one bead per droplet. The same approach can be used for other types if porous polymer gel beads, such as polyacrylamide, agarose, chitosan, gelatin, and the like.

Using the properties of fluid-bead and bead-bead interactions in the bead channels, a spiral microfluidic device was designed that allowed for gel beads of 40 µm or less to focus and order prior to entering a droplet generation junction of the microfluidic device. The microfluidic device had a bead channel with a cross-sectional dimension of 75×100 µm that focused the beads to their two focusing positions within a length of approximately 1.2-3 cm from the inlet. The flow rate of the bead solution was set at 50 µL/min and the cell solution were set at 10 µL/min. The input bead concentration was set at 1800 beads/µL. The flow rate of the oil was set at 180 µL/min, which resulted in approximately ~2000 droplets per second being created. At these flow rates, as shown in FIGS. 13A and 13B, clear bead ordering was observed and an ordered stream of beads was observed entering the droplet generation junction. As shown in Table 5, about 5.2% of the resulting droplets had more than one bead within a droplet and a 67.9% reduction compared to Poisson statistics.

TABLE 5

Distribution of beads inside droplets for other flow rate conditions

| Bead Fluid Flow Rate (µL/min) | Cell Fluid Flow Rate (µL/min) | Oil Flow Rate (µL/min) | Desired Droplets (%) | Error Droplets (%) | Empty Droplets (%) |
|---|---|---|---|---|---|
| 40 | 10 | 180 | 42.1 | 1.9 | 56.0 |
| 40 | 20 | 180 | 39.1 | 1.8 | 59.1 |
| 50 | 10 | 180 | 52.1 | 5.2 | 42.8 |

Altogether, these data indicate that the focusing of 30 to 40 µm-diameter 30 to 40 µm-diameter sepharose gel beads to the two focusing positions in a rectangular channel is achievable within a length of 1.2-3 cm from the bead fluid inlet.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of generating liquid droplets containing beads and cells, the method comprising:
    inertial focusing a bead fluid having beads suspended therein into a first ordered stream of beads within a first inertial focusing microchannel;
    inertial focusing a cell fluid having cells suspended therein into a second ordered stream of cells within a second inertial focusing microchannel; and
    merging the first ordered stream with the second ordered stream at a convergence channel at a combined flow rate and forming a plurality of droplets at a junction, wherein each droplet comprises a first predetermined number of one or more cells and a second predetermined number of one or more beads within each droplet,
    wherein the first inertial focusing microchannel and the second inertial focusing microchannel are connected to the convergence channel and the convergence channel is connected to the junction, and
    wherein the combined flow rate is selected so that a width of the convergence channel divided by a width of the first inertial focusing microchannel is proportional to the combined flow rate of the cell fluid and the bead fluid divided by a flow rate of the bead fluid to control the number of beads per droplet.

2. The method of claim 1, wherein forming the plurality of droplets at the junction comprises contacting the merged first ordered stream and second ordered stream with a third fluid immiscible in the bead fluid and the cell fluid.

3. The method of claim 1, wherein inertial focusing the beads comprises flowing the beads through a first inertial focusing portion of the first inertial focusing microchannel.

4. The method of claim 3, further comprising adjusting of the spacing between beads in the first ordered stream by flowing the bead fluid through an expansion or contraction region of the first inertial focusing microchannel after the first inertial focusing portion.

5. The method of claim 1, wherein inertial focusing the cells comprises flowing the cells through a second inertial focusing portion of the second inertial focusing microchannel.

6. The method of claim 5, further comprising adjusting of the spacing between cells in the second ordered stream by flowing the cell fluid through an expansion or contraction region of the second inertial focusing microchannel after the second inertial focusing portion.

7. The method of claim 1, wherein at least one of the first inertial focusing portion of the first inertial focusing microchannel and the second inertial focusing portion of the second inertial focusing microchannel has a curved region.

8. The method of claim 7, wherein each curved region is independently S-shaped, sigmoidal, sinusoidal, or spiral shaped.

9. The method of claim 1, wherein the beads comprise nucleotide fragments.

10. The method of claim 9, wherein the nucleotide fragments comprise a barcode region, an index region, and a capture region.

11. The method of claim 10, wherein the barcode region of each nucleotide fragment is at least about six nucleotides in length.

12. The method of claim 10, wherein the index region of each nucleotide fragment is at least about four nucleotides in length.

13. The method of claim 10, wherein the capture region comprises poly-T nucleotides and is at least about ten nucleotides in length.

14. The method of claim 1, wherein the first predetermined number of one or more cells is one and the second predetermined number of one or more beads is one.

15. The method of claim 1, wherein the flow rate of the first ordered stream is at least about 10 µL/min.

16. The method of claim 1, wherein the flow rate of the second ordered stream is at least about 10 µL/min.

17. The method of claim 1, wherein inertial focusing the beads further comprises co-flowing the bead fluid with a bead-free fluid.

18. The method of claim 1, wherein inertial focusing the cells further comprises co-flowing the cell fluid with a cell-free fluid.

19. The method of claim 1, further comprising:
   determining a first distribution of the number of beads in a droplet and a second distribution of the number of cells in a droplet; and
   adjusting the first ordered stream based on the determined first distribution and second distribution such that the first distribution and the second distribution achieve underdispersed-Poisson statistics.

20. The method of claim 19, wherein adjusting the first ordered stream achieves one bead and one cell within a single droplet.

21. The method of claim 19, wherein adjusting the first ordered stream comprises adjusting the concentration of the bead fluid by adjusting a first diluent introduced to the bead fluid.

22. The method of claim 19, further comprising:
   adjusting the second ordered stream based on the determined first distribution and second distribution, such that the first distribution and the second distribution achieve underdispersed-Poisson statistics.

23. The method of claim 22, wherein adjusting the second ordered stream achieves one bead and one cell within a single droplet.

24. The method of claim 22, wherein adjusting the second ordered stream comprises adjusting the concentration of the cell fluid by adjusting a second diluent introduced to the cell fluid.

* * * * *